US012321271B2

(12) United States Patent
Landers et al.

(10) Patent No.: US 12,321,271 B2
(45) Date of Patent: Jun. 3, 2025

(54) DISTRIBUTED SYSTEM LEVEL CACHE

(71) Applicant: Imagination Technologies Limited, Kings Langley (GB)

(72) Inventors: Mark Landers, Hartwell (GB); Ian King, Hertfordshire (GB); Alistair Goudie, Hertfordshire (GB); Michael John Livesley, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 18/374,821

(22) Filed: Sep. 29, 2023

(65) Prior Publication Data

US 2024/0160571 A1    May 16, 2024

(30) Foreign Application Priority Data

Sep. 29, 2022  (GB) ...................................... 2214307

(51) Int. Cl.
*G06F 12/0811* (2016.01)
*G06F 12/0877* (2016.01)
(52) U.S. Cl.
CPC ...... *G06F 12/0811* (2013.01); *G06F 12/0877* (2013.01)

(58) Field of Classification Search
CPC ......................... G06F 12/0811; G06F 12/0877
See application file for complete search history.

(56) References Cited

U.S. PATENT DOCUMENTS

| 7,853,752 | B1 | 12/2010 | Agarwal et al. | |
|---|---|---|---|---|
| 9,792,147 | B2 | 10/2017 | Guthrie et al. | |
| 2012/0005524 | A1* | 1/2012 | Rangarajan | G06F 11/1666 714/6.1 |
| 2013/0268711 | A1* | 10/2013 | Safranek | G06F 13/4004 710/308 |
| 2015/0312144 | A1* | 10/2015 | Gobriel | H04L 45/44 709/242 |
| 2017/0177492 | A1 | 6/2017 | Loh | |
| 2023/0342298 | A1* | 10/2023 | Vasekin | G06F 12/0811 |

* cited by examiner

*Primary Examiner* — Prasith Thammavong
(74) *Attorney, Agent, or Firm* — Potomac Law Group, PLLC; Vincent M DeLuca

(57) ABSTRACT

A processor and a method of obtaining data for a processor are provided. The processor comprises at least a first core, a second core, and a distributed cache. The distributed cache comprises a first cache slice connected to the first core and a second cache slice connected to the second core and to the first cache slice. The first cache slice is configured to receive a memory access request from the first core and forward the memory access request to the second cache slice.

20 Claims, 9 Drawing Sheets

DISTRIBUTED SYSTEM LEVEL CACHE

CROSS-REFERENCE TO RELATED APPLICATIONS AND CLAIM OF PRIORITY

This application claims foreign priority under 35 U.S.C. 119 from United Kingdom patent application No. GB 2214307.7 filed on 29 Sep. 2022, which is incorporated herein by reference in its entirety.

TECHNICAL FIELD

The present disclosure relates to cache systems for processors, in particular multicore processors. It may be particularly relevant for a multicore graphics processing unit (GPU).

BACKGROUND

In order to perform tasks, a processing unit (PU) requires data to process. This data is often stored in a memory device external to the PU, which the PU must access in order to obtain the required data. However, accessing external memory is slow, and generally subject to limited bandwidth, and the same data may need to be accessed multiple times. Consequently, the need to access data from external memory tends to reduce PU performance. To address this problem, a PU may be provided with a cache.

A cache is a memory device located inside the PU, or at least closer to the PU than the external memory. Due to the relative proximity of the cache to the PU, the PU is able to access the cache more quickly than the PU can access the external memory. Furthermore, caches typically consist of static RAM (SRAM), while external memory typically consists of dynamic RAM (DRAM). SRAM can be read from and written to more quickly than DRAM, even where each memory has the same proximity to the PU. By storing the data to be processed in the cache, data can be obtained more quickly and the PU performance can be improved.

However, including a cache within a PU occupies chip space that might otherwise have been used to provide additional processing hardware. Additionally, SRAM is more expensive DRAM, and including SRAM in a PU can increase the manufacturing cost of the PU. In order to limit the costs incurred by the cache (both financially and in terms of silicon area), the cache is typically substantially smaller than the external memory (both physically, and in terms of memory capacity). Consequently, the cache is only able to store a subset of the data stored in the external memory.

A PU provided with a cache can achieve the greatest performance gains when the limited memory capacity of the cache is prioritised for storing the data most frequently required by the PU. This prioritisation of memory capacity leads to the most significant reduction of the number of times that the PU accesses the external memory. When the PU requires an element of data, it first checks the cache for that data. If the cache contains the data, the PU can read the data from the cache and does not need to access the external memory, saving a substantial amount of time, as well as using memory-access bandwidth more efficiently. If the cache does not contain the data, the PU then accesses the external memory to obtain the data, and can cache a copy of the data for future use. In this way, use of a cache can reduce the number of times a PU accesses external memory, improving the performance of the PU.

To overcome the performance limitations caused by the limited memory capacity of the cache, a multi-level cache system can be implemented. In this system, the PU is provided with a hierarchy of caches that have increasing memory sizes but decreasing access speeds. When the PU requires an element of data, the caches can be searched for the data (in an order corresponding to their position within the cache hierarchy). The smallest and fastest cache may be searched first, and, if that cache does not contain the data, the next smallest (and next fastest) cache may then be searched. Ultimately, if none of the caches contain the data, the data will be obtained from the external memory, and may be cached in one of the caches.

SUMMARY

In order to improve the speed at which a set of tasks can be performed, a multi-core PU can be utilised. The cores of the PU can operate in parallel to perform tasks. It would be desirable to provide each core with a cache system to further improve the performance of the PU.

However, providing each of the cores of the PU with a cache system can lead to an inefficient use of bandwidth. For example, consider the case where an element of data is required by two or more cores. When a core first requires the element of data, it will access the external memory and copy the element of data into its cache system. Later, when another core requires that same element of data, it will also access the external memory and copy the element of data into its cache system. In other words, each time a new core requires that same element of data, it must access the external memory and copy the data into its cache system. This duplication of the accessing of the external memory and copying of the element of data wastes bandwidth and processing time, reducing the performance of the multi-core GPU. Similarly, part of the memory capacity of the GPU, viewed as a whole, is wasted by the duplication of data between the caches of the various cores.

Furthermore, the lack of a coherent view of memory between the cores can lead to processing errors. One example of this is the processing of atomic operations. When performing atomic operations involving an element of data, the memory address of that element of data must not be accessed for any other task. As a part of an atomic operation, the core performing the operation locks access to the memory address containing the element of data until the atomic operation has been completed. In a single core system, tasks are either performed sequentially, in which case there is no conflict for access to an element of data, or the core is multi-threaded and tasks are performed in parallel. However, because the threads of the core all access to the same cache, they maintain a coherent view of memory. When two threads both attempt to perform an atomic operation on the same element of data, they will both attempt to lock access to the element of data in the cache. Whichever atomic operation began first will also be first to lock access to the element of data in the cache, forcing the second atomic operation to be performed after completion of the first atomic operation. In this way, the sequential ordering of the atomic operations is respected, and it is ensured that the atomic operations are not performed on stale data (out-of-date data). However, in a multi-core PU in which each core has its own cache, the various cores do not maintain a coherent view of memory at the cache level. Where an element of data is copied into the cache of a first core, and the cache of a second core, and the first core performs an atomic operation on the element of data, the first core will lock access to the element of data in its cache. However, because each core cannot access the cache of any other core, the first core locking access to the element of data in its own cache does not prevent the second core from accessing the cached copy of the same element of data in its respective cache, and performing an atomic operation. This means that the atomic operations may be performed out of sequence and/or on stale data, which can lead to errors. For example, if a first atomic operation and a second atomic operation are scheduled to be performed on the same element of data sequentially, and the first atomic operation updates the element of data, then the second atomic operation will only produce the correct output if it processes the updated element of data. However, if the first atomic operation is performed by a first core and the second atomic operation is performed by a second core, and each core has its own cache, then it is possible that the second atomic operation may begin before the first atomic operation has completed, using stale data cached in the second core's cache. Not only will this lead to the output of the second atomic operation being incorrect, it may cause subsequent operations to produce the wrong results if the output of the second atomic operation is written to memory (for example, if the second atomic operations completes after the first atomic operation and overwrites the updated data in the memory).

Even where an element of data is not (yet) stored in the caches of the multi-core PU, atomic operations may still pose a performance challenge. When the first core begins an atomic operation, it accesses the external memory to cache the relevant data into its cache, and access to that data in the external memory is locked. If, at this time, the second core begins a second atomic operation that requires the same data, the second core also accesses the external memory to obtain the data, but finds that the memory address of the data is locked. The second core must wait for the memory address to be unlocked, which means waiting for the first core to complete its atomic operation and to write the new data back to the external memory. As the second core cannot know in advance when this will happen, it must repeatedly access the external memory to check the status of the memory address. Due to the long access time of the external memory this may significantly delay the second core from beginning its tasks, and is bandwidth inefficient.

It would be desirable to provide a more bandwidth efficient system, and improve the coherency of the cores, thereby improving performance.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A processor and a method of obtaining data for a processor are provided. The processor comprises at least a first core, a second core, and a distributed cache. The distributed cache comprises a first cache slice connected to the first core and a second cache slice connected to the second core and to the first cache slice. The first cache slice is configured to receive a memory access request from the first core and forward the memory access request to the second cache slice.

According to one aspect, there is provided a processor, comprising:
 a plurality of cores comprising a first core and a second core;
 a distributed cache comprising a plurality of cache slices including a first cache slice and a second cache slice; and
 a first interconnect between the first cache slice and the second cache slice, wherein the distributed cache is configured to cache a copy of data stored at a plurality of memory addresses of a memory,
 wherein the first cache slice is connected to the first core, and the second cache slice is connected to the second core,
 wherein the first cache slice is configured to cache a copy of data stored at a first set of memory addresses of the plurality of memory addresses,
 wherein the second cache slice is configured to cache a copy of data stored at a second, different, set of memory addresses of the plurality of memory addresses,
 wherein the first cache slice is configured to:
  receive, from the first core, a first memory access request specifying a target memory address of the memory, wherein the plurality of memory addresses includes the first target memory address;
  identify based on the target memory address a target cache slice among the first and second cache slices, wherein the target cache slice is the cache slice configured to cache a copy of the data stored at the target memory address; and
  responsive to the target cache slice being identified as the second cache slice, forward the first memory access request to the target cache slice, and
 wherein the first interconnect is configured to convey the first memory access request to the second cache slice.

In some examples, the processor may be a graphics processing unit (GPU), a central processing unit (CPU), or a digital signal processor (DSP).

The first cache slice may be said to be associated with the first core, and the second cache slice may be said to be associated with the second core. More generally, there may be a 1:1 association between the cache slices of the distributed cache and the cores of the processor. The first cache slice may be directly connected to the first core, and the second cache slice may be directly connected to the second core. More generally, each of the plurality of cache slices may be associated with and (optionally directly) connected to a different core of the processor.

In some examples, the distributed cache may comprise more than two cache slices.

In some examples, the first set of memory addresses may all be different to the second set of memory addresses. In other words, the first set of memory addresses and the second set of memory addresses may be disjoint sets.

The target cache slice may be the first cache slice or the second cache slice.

Similar to the first cache slice, the second cache slice may be configured to receive a second memory access request from the second core, wherein the second memory access request identifies a second target memory address, and wherein the second target memory address is a part of one of the first and second sets of memory addresses. The second cache slice may be configured to identify a second target cache slice, and forward the second memory access request to the second target cache slice, in the same way that the first crossbar was configured to identify the first target cache slice and forward the first memory access request to the first target cache slice. The second target cache slice may be the same cache slice as the first target cache slice. In some examples, the second target cache slice might be the first cache slice.

The memory may be a memory device external to the processor, for example, DRAM.

The first cache slice may comprise a first cache bank configured to cache the copy of the data stored at the first set of memory addresses, and a first crossbar connected to the first cache bank. The second cache slice may comprise a second cache bank configured to cache the copy of the data stored at the second set of memory addresses, and a second crossbar connected to the second cache bank. The first crossbar may be configured to receive, from the first core, the first memory access request, identify based on the target memory address a target cache bank among the first and second cache banks, wherein the target cache bank is the cache bank configured to cache the copy of the data stored at the target memory address, and forward the first memory access request to the target cache bank. The first interconnect may be configured to convey the first memory access request to the second crossbar when the target cache bank is identified as the second cache bank.

The first core may be connected to the first crossbar, and the second core may be connected to the second crossbar. The crossbar of each cache slice may be configured to receive memory access requests from the core to which the cache slice is connected.

The first crossbar and the second crossbar may be connected directly via the first interconnect, or may be connected indirectly via additional crossbars in other cache slices, and by additional interconnects. For example, the first crossbar may be connected to a third crossbar in a third cache slice by an interconnect, and the third crossbar may be connected to the second crossbar by another interconnect. In this way, the first crossbar and the second crossbar may be indirectly connected, and the first interconnect may convey a memory access request to the third cache slice via the second cache slice. In other words, the first interconnect may convey a memory access request to a cache slice directly or indirectly. More generally, each crossbar in the distributed cache may be directly connected to at least one other crossbar by an interconnect. The interconnects may be unidirectional, or bidirectional.

The cache banks of the distributed cache may be physically addressed.

Each cache bank comprises a set of cache addresses. Every cache bank may be configured to queue access to each of its cache addresses, such that only one memory access request can be executed for a cache address at any given time. For example, if a cache bank receives more than one memory access request specifying the same target memory address, the cache bank may serialise the execution of the memory access requests based on the time at which each memory access request was issued. Additionally, or alternatively, the crossbar of a cache slice may be configured to queue access to each of the cache banks in that cache slice.

Each cache bank in the distributed cache may be configured to store a copy of data associated with a set of memory addresses, and the sets may all be disjoint. For example, where the processor includes a third cache slice comprising a third cache bank configured to cache a copy of data stored at a third set of memory addresses of the memory, the first, second and third sets of memory address may all be different, in that each memory address may only be found in one of the sets. As a result of this, data is not duplicated between cache banks of the distributed cache. This means that more data can be cached in the distributed cache for a given cache memory capacity.

Similar to the first crossbar, the second crossbar may be configured to receive a second memory access request from the second core, wherein the second memory access request identifies a second target memory address, and wherein the second target memory address is a part of one of the first and second sets of memory addresses. The second crossbar may be configured to identify a second target cache bank, and forward the second memory access request to the second target cache bank, in the same way that the first crossbar was configured to identify the first target cache bank and forward the first memory access request to the first target cache bank. The second target cache bank may be the same cache bank as the first target cache bank. In some examples, the second target cache bank might not reside in the second cache slice. For example, the first cache bank may be the second target cache bank.

The first crossbar may be configured to transmit the first memory access request to the second crossbar via the first interconnect when the target cache bank is identified as the second cache bank. The second crossbar may be configured to receive, via the first interconnect, the first memory access request when the target cache bank is the second cache bank; and send, to the second cache bank, the first memory access request when the target cache bank is the second cache bank.

The processor may further comprise a third core, a third cache slice and a second interconnect between the second cache slice and the third cache slice. The third cache slice may be connected to the third core. The third cache slice may comprise a third cache bank configured to cache a copy of data stored at a third set of memory addresses of the plurality of memory addresses, and a third crossbar connected to the third cache bank. The first crossbar may be configured to transmit the first memory access request to the second crossbar via the first interconnect when the third cache bank is identified as the target cache bank. The second crossbar may be configured to transmit the first memory access request to the third crossbar via the second interconnect when the target cache bank is identified as the third cache bank. The third crossbar may be configured to send, to the third cache bank, the first memory access request when the target cache bank is identified as the third cache bank.

In other words, the first crossbar and the second crossbar may route the first memory access request around the distributed cache to the cache slice containing the target cache bank.

It should be understood that, when a crossbar sends a memory access request to a cache bank in the same cache slice as the crossbar, the memory access request is sent internally to the cache slice. In other words, the memory access request is not sent outside of the cache slice via an interconnect.

Each cache bank may be associated with an identifier. The first crossbar may be configured to use a hash function to map each memory address in the memory to the identifier of the cache bank configured to cache a copy of the data stored at that memory address. The first crossbar may be configured to use the hash function to identify the target cache bank based on the target memory address.

The identifier of each cache bank may be unique, meaning that no two cache banks have the same identifier. In particular, in examples in which the identifiers are unique, each crossbar uses the same hash function. However, in some examples the identifiers may not be unique, and the crossbars may use different hash functions.

The processor may be partitionable to partition the cores into at least a first domain comprising the first core, the second core, the first cache slice and the second cache slice; and a second domain comprising the third core and the third cache slice. The first crossbar and the second crossbar may be configured to use a first hash function, and the third crossbar may be configured to use a second hash function. The first hash function may be configured such that: for any target memory address, the first crossbar can identify the first cache bank or the second cache bank as the target cache bank, and cannot identify the third cache bank as the target cache bank; and for any target memory address, the second crossbar can identify the first cache bank or the second cache bank as the target cache bank, and cannot identify the third cache bank as the target cache bank. The second hash function may be configured such that, for any target memory address, the third crossbar can identify the third cache bank as the target cache bank, and cannot identify the first cache bank or the second cache bank as the target cache bank.

In this way, the hash functions can facilitate the partitioning of the cores of the processor, such that cores of different domains do not make use of the same cache banks. More specifically, the cores in each domain can only access the cache banks in that same domain.

The partitioning of the processor may be a logical partition implemented by means of software. The partitioning of the processor may be implemented by programming the crossbars of the first cache slice and the second cache slice to use the first hash function, and by programming the crossbar of the third cache slice to use the second hash function. The partitioning may be dynamic, in that the processor may be partitionable during use, and it may be possible to revert it to an un-partitioned state during use.

In some examples, when a processor is partitioned, the domains are utilised to perform different tasks that require different data. However, in some cases, the domains may require the same data. Consequently, in some examples, the first cache bank and the third cache bank may be configured such that the first set of memory addresses and the third set of memory addresses share at least one memory address. In other words, the first and third cache banks may be configured such that at least some data may be duplicated between the first cache bank and the third cache bank. More generally, the distributed cache may be configured such that data can be duplicated between different domains, but not within a domain.

In some examples, the first domain and the second domain may comprise the same number of cache slices (of the same sizes). In this case, the identifiers used in the first domain and the second domain may be identical, and the first hash function and the second hash function may be identical. However, where the first domain and the second domain comprise different numbers of cache slices, the first hash function and the second hash function are different.

The first crossbar may comprise a plurality of output channels, wherein at least a first output channel is connected to the first cache bank and at least a second output channel is connected to the first interconnect. The first crossbar may comprise a routing table, wherein the routing table indicates, for each identifier, a predetermined output channel leading to the cache bank associated with that identifier. The first crossbar may be configured to identify, using the routing table and based on the identifier of the target cache bank, the predetermined output channel leading to the target cache bank; and transmit, via the predetermined output channel, the first memory access request.

The first output channel and the first cache bank may be directly connected, or may be indirectly connected via one or more additional hardware elements. Similarly, the second output channel and the first interconnect may be directly connected, or may be indirectly connected via one or more additional hardware elements. For example, where the first cache slice and the second cache slice are implemented on different silicon dies, a conversion unit may be implemented between the second output channel and the first interconnect. The conversion unit may be configured to convert data between different protocols, enabling data to be transferred between cache slices utilising different protocols. The conversion unit may comprise one or more of: a protocol converter, a link controller, a serialiser-deserialiser (SerDes), and a clock resynchroniser.

In some examples in which the target cache bank does not reside in the first cache slice, the first crossbar may transmit to the second crossbar the identifier of the target cache bank along with the memory access request.

Each crossbar in the distributed cache may comprise a plurality of output channels, and a routing table. The routing table of each crossbar may be pre-programmed with a mapping between each cache bank in the distributed cache and an output channel of that crossbar. The mapping may be configured, for example, to provide the most direct route to the target cache bank (the route with the smallest hop latency).

A first output channel of the first crossbar may be connected to the first cache bank, and a second output channel of the first crossbar may be connected to the second crossbar via the first interconnect. A first output channel of the second crossbar may be connected to the second cache bank. Where the first cache bank is the target cache bank, the routing table of the first crossbar may be programmed to map the identifier to the first output channel. Where the second cache bank or the third cache bank is the target cache bank, the routing table of the first crossbar may be programmed to map the identifier to the second output channel. More generally, the routing table of the first crossbar may be programmed to map the identifier of any cache bank that does not reside in the first cache slice to the second output channel.

The first crossbar and the second crossbar may be configured to use the same hash function. The first crossbar and the second crossbar may use different routing tables.

The topology of the distributed cache describes the physical connections between the cache slices, or, in other words, which cache slices are directly connected by interconnects. The routing table defines which of the interconnects in the topology are used, and how. The mapping between the identifiers of the cache banks and the output channels of the crossbars in the routing table is constrained by the topology of the distributed cache.

The target cache bank may be configured to, when the first memory access request is a read request, search the target cache bank for the cached copy of the data stored at the target memory address. The target cache bank may be configured to, responsive to the search finding the cached copy of the data, read the data stored at the target memory address from the target cache bank. The target cache bank may be configured to, responsive to the search failing to find the data, read the data stored at the target memory address from the memory.

The target cache bank may be further configured to, responsive to the search finding the cached copy of the data, output the data stored at the target memory address to the first core (or more generally to the core that issued the memory access request).

The target cache bank may be further configured to, responsive to the search failing to locate the copy of the data in the target cache bank, cache a copy the data stored at the target memory address, and provide the data the data to the requesting core.

The first core may be configured to, when the first memory access request is a write request, write to the target cache bank.

The plurality of cache slices may be connected in one of a linear topology, a ring topology, a partially cross-linked ring topology, a densely cross-linked ring topology, a fully connected topology and a hybrid topology.

In the linear topology at least two cache slices are each directly connected to exactly one other cache slice, and at least one cache slice may be directly connected to exactly two other cache slices. In the ring topology, each cache slice is directly connected to exactly two other cache slices to define the ring topology. In the partially cross-linked ring topology each cache slice is directly connected to at least two other cache slices to define the ring topology, at least two cache slices are each directly connected to exactly two other cache slices, and at least two cache slices are each directly connected to at least three other cache slices. In the densely cross-linked ring topology each cache slice is directly connected to at least three other cache slices, and at least two cache slices are not directly connected to one another. In the fully connected topology each cache slice is directly connected to every other cache slice. In the hybrid topology at least one cache slice is directly connected to at least three other cache slices, and at least one cache slice is directly connected to exactly one other cache slice.

The first core may comprise a first cache. The first caches may be configured to cache a copy of the data stored in the memory. The first core may be configured to search the first cache for the data stored at the target memory address, and responsive to the search failing to find the data in the first cache, transmit the first memory access request to the first cache slice.

Responsive to the search failing to find the data in the first cache, the first core may transmit the first memory access request to the first crossbar of the first cache slice.

The first core may be able to access the first cache quicker than it can access the first cache slice. In other words, the first cache may be a lower level cache than the distributed cache. The second core may comprise a second cache similar to the first cache. More generally, each core in the processing unit may comprise a cache at a lower level than the distributed cache, and each core may be configured to search the lower level cache for the copy of the data stored at the target memory address before transmitting a memory access request to the distributed cache.

The first cache may comprise a compressor and a decompressor. The compressor may be configured to compress a first set of uncompressed data stored in the first cache, and provide the compressed first set of data to the first cache slice. The decompressor may be configured to receive a second set of data from the distributed cache, wherein the second set of data is compressed, and decompress the second set of data.

The decompressed second set of data may be cached in the first cache.

According to another aspect, there is provided is a method of obtaining data for a processor. The processor comprises a plurality of cores comprising a first core and a second core, a distributed cache comprising a plurality of cache slices including a first cache slice and a second cache slice, and a first interconnect between the first cache slice and the second cache slice. The distributed cache is configured to cache a copy of data stored at a plurality of memory addresses of a memory. The first cache slice is configured to cache a copy of data stored at a first set of memory addresses of the plurality of memory addresses, and the second cache slice is configured to cache a copy of data stored at a second, different, set of memory addresses of the plurality of memory addresses. The method comprises receiving, by the first cache slice, a first memory access request specifying a target memory address of the memory, wherein the plurality of memory addresses includes the target memory address, identifying, by the first cache slice, based on the target memory address, a target cache slice among the first and second cache slices, wherein the target cache slice is the cache slice configured to cache a copy of the data stored at the target memory address, and responsive to the target cache slice being identified as the second cache slice, forwarding, by the first cache slice, the first memory access request to the target cache slice, wherein the first interconnect is configured to convey the first memory access request to the second cache slice.

The first cache slice may comprise a first cache bank configured to cache the copy of the data stored at the first set of memory addresses, and a first crossbar connected to the first cache bank. The second cache slice may further comprise a second cache bank configured to cache the copy of the data stored at the second set of memory addresses, and a second crossbar connected to the second cache bank. The method may comprise receiving, by the first crossbar, the first memory access request; identifying, by the first crossbar, based on the target memory address, a target cache bank among the first and second cache banks, wherein the target cache bank is the cache bank configured to cache a copy of the data stored at the target memory address; and forwarding, by the first crossbar, the first memory access request to the target cache bank. The first interconnect may be configured to convey the first memory access request to the second crossbar when the target cache bank is identified as the second cache bank.

The forwarding may comprise, when the target cache bank is identified as the second cache bank: identifying, by the first crossbar and using a routing table, an output channel of the first crossbar leading to the target cache bank; and transmitting, by the first crossbar, the memory access request to the second crossbar via the first interconnect. The method may further comprise receiving, by the second crossbar, the memory access request; identifying, by the second crossbar, based on the target memory address, the target cache bank; and sending, by the second crossbar, the first memory access request to the second cache bank.

The method may further comprise, when the first memory access request is a read request: searching the target cache bank for the cached copy of the data stored at the target memory address; responsive to the search finding the data, reading the data stored at the target memory address from the target cache bank; and responsive to the search failing to find the data, reading from the memory the data from the target memory address.

The method may further comprise receiving, by the second crossbar, a second memory access request specifying the target memory address; identifying, by the second crossbar, the target cache bank; and forwarding, by the second crossbar, the second memory access request to the target cache bank.

The method may further comprise: receiving, by the target cache bank, the first memory access request; receiving, by the target cache bank, the second memory access request, wherein the target cache bank receives the first memory access request before receiving the second memory access request; locking access to the cached copy of the data; reading, by the first core, the cached copy of the data; overwriting, by the first core, at least a part of the cached copy of the data with updated data; unlocking access to the cached copy of the data; after unlocking access to the cached copy of the data, locking access to the cached copy of the data; reading, by the second core, the cached copy of the data; overwriting, by the second core, at least a part of the cached copy of the data with updated data; and unlocking access to the cached copy of the data.

Access to the cached copy of the data may be locked by the cache slice in which the cached copy of the data is stored. In some examples, the crossbar of the cache slice and/or the cache bank in which the cached copy of the data is stored may lock and unlock access to the cached copy of the data.

In this way, access to data in the cache banks of the distributed cache can be serialised. This prevents a core from reading stale data from the distributed cache, which could lead to processing errors.

Each cache bank may be associated with an identifier. The step of identifying the target cache bank may comprise mapping, by the first crossbar using a hash function, the target memory address to the target cache bank.

The processor may further comprise a third core, a third cache slice and a second interconnect between the second cache slice and the third cache slice. The third cache slice may be connected to the third core, and may comprise a third cache bank configured to cache a copy of data stored at a third set of memory addresses of the plurality of memory addresses, and a third crossbar connected to the third cache bank. The method may further comprise, when the target cache bank is identified as the third cache bank: transmitting, by the first crossbar, the first memory access request to the second crossbar via the first interconnect; receiving, by the second crossbar, the first memory access request; transmitting, by the second crossbar, the first memory access request to the third crossbar via the second interconnect; receiving, by the third crossbar, the first memory access request; and sending, by the third crossbar, the first memory access request to the third cache bank.

The processor may further comprise a third core, a third cache slice and a second interconnect between the second cache slice and the third cache slice. The third cache slice may be connected to the third core, and may comprise a third cache bank configured to cache a copy of data stored at a third set of memory addresses of the plurality of memory addresses, and a third crossbar connected to the third cache bank. The method may further comprise partitioning the processor into a first domain comprising the first core, the second core, the first cache slice and the second cache slice; and a second domain comprising the third core and the third cache slice; configuring the first crossbar and the second crossbar to use a first hash function; and configuring the third crossbar to use a second hash function. The first hash function may be configured such that, for any target memory address the first crossbar can identify the first cache bank or the second cache bank as a target cache bank and cannot identify the third cache bank as the target cache bank; and for any target memory address the second crossbar can identify the first cache bank or the second cache bank as the target cache bank and cannot identify the third cache bank as the target cache bank. The second hash function may be configured such that, for any target memory address, the third crossbar may identify the third cache bank as the target cache bank and cannot identify the first cache bank or the second cache bank as the target cache bank.

The method may further comprise configuring the routing table of the second crossbar such that the routing table does not identify an output channel leading to the third crossbar.

More generally, the routing table of each crossbar within a domain that is directly connected to a crossbar in a different domain may be configured such that the routing table does not identify any output channels leading to the crossbar in the different domain.

Also provided is a processor configured to perform the method as summarised above. The processor may be embodied in hardware on an integrated circuit.

Also provided is a method of manufacturing, using an integrated circuit manufacturing system, a processor as described above.

Also provided is a method of manufacturing, using an integrated circuit manufacturing system, a processor as summarised above, the method comprising: processing, using a layout processing system, a computer readable description of the processor so as to generate a circuit layout description of an integrated circuit embodying the processor; and manufacturing, using an integrated circuit generation system, the processor according to the circuit layout description.

Also provided is computer readable code configured to cause the method as summarised above to be performed when the code is run. Also provided is a computer readable storage medium (optionally non-transitory) having encoded thereon the computer readable code.

Also provided is an integrated circuit definition dataset that, when processed in an integrated circuit manufacturing system, configures the system to manufacture a processor as summarised above. There may be provided a (optionally non-transitory) computer readable storage medium having stored thereon a computer readable description of a processor that, when processed in an integrated circuit manufacturing system, causes the integrated circuit manufacturing system to manufacture an integrated circuit embodying a processor as summarised above.

Also provided is a computer readable storage medium (optionally non-transitory) having stored thereon a computer readable description of a processor as summarised above which, when processed in an integrated circuit manufacturing system, causes the integrated circuit manufacturing system to: process, using a layout processing system, the computer readable description of the processor so as to generate a circuit layout description of an integrated circuit embodying the processor; and manufacture, using an integrated circuit generation system, the processor according to the circuit layout description.

Also provided is an integrated circuit manufacturing system configured to manufacture a processor as summarised above.

Also provided is an integrated circuit manufacturing system comprising: a computer readable storage medium (optionally non-transitory) having stored thereon a computer readable description of the processor as summarised above; a layout processing system configured to process the computer readable description so as to generate a circuit layout description of an integrated circuit embodying the processor; and an integrated circuit generation system configured to manufacture the processor according to the circuit layout description.

The layout processing system may be configured to determine positional information for logical components of a circuit derived from the integrated circuit description so as to generate a circuit layout description of an integrated circuit embodying the processor.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
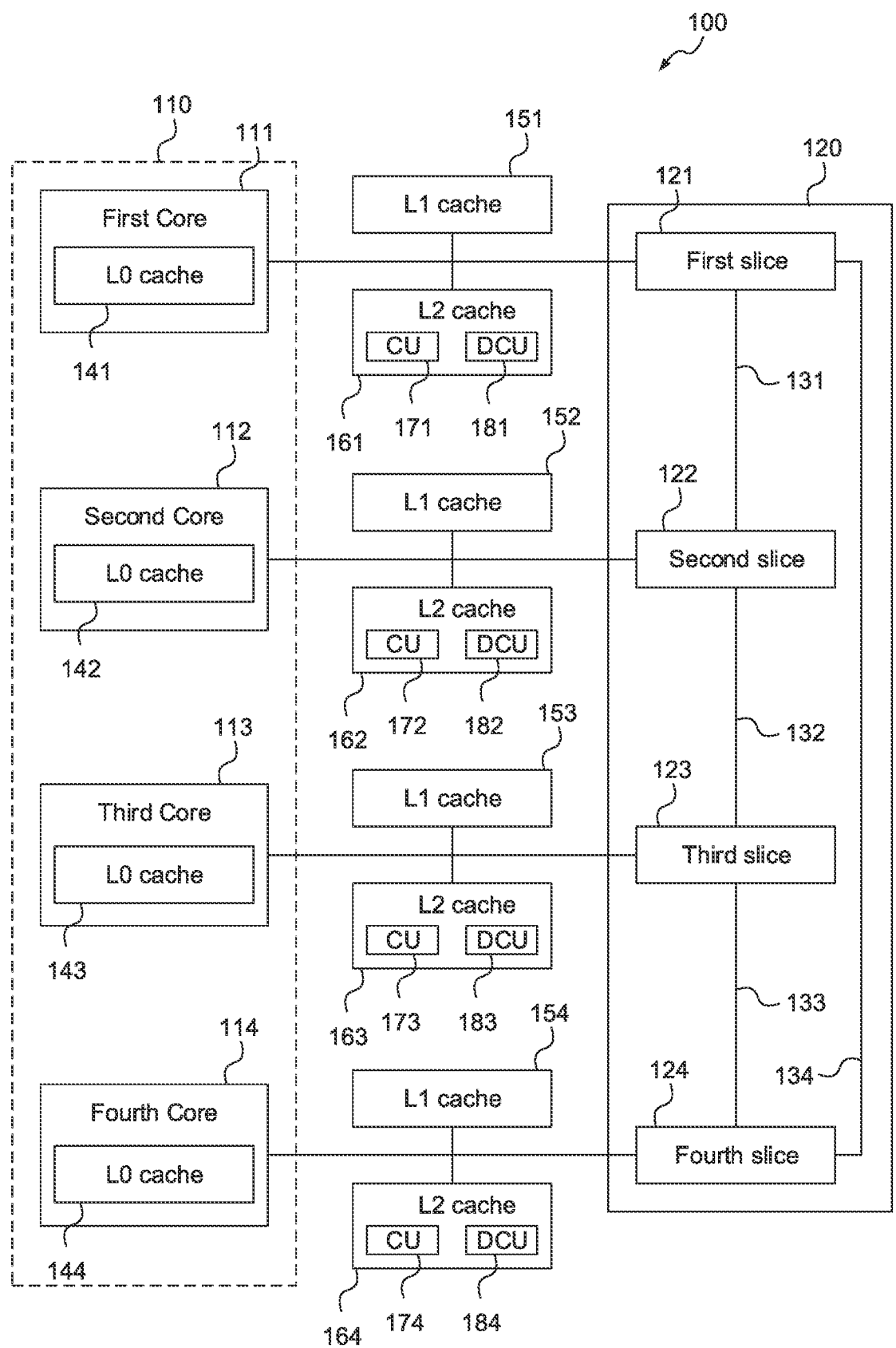
FIG. 1 is a block diagram of a processor according to an example.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

FIG. 1 is a block diagram of a processor 100 in a graphics processing unit (GPU) according to an example. The processor 100 is in communication with an external memory (not shown). The processor 100 comprises a plurality of cores 110, and a distributed cache 120. The plurality of cores 110 comprises: a first core 111, a second core 112, a third core 113 and a fourth core 114. The first core 111 is connected to a first cache slice 121 of the distributed cache 120. The second core 112 is connected to a second cache slice 122 of the distributed cache 120. The third core 113 is connected to a third cache slice 123 of the distributed cache 120. The fourth core 114 is connected to a fourth cache slice 124 of the distributed cache 120.

The cache slices 121, 122, 123, 124 of the distributed cache 120 are configured to cache data stored in the external memory. In particular, the first cache slice 121 is configured to cache data stored at a first set of memory addresses in the external memory, and the second cache slice 122 is configured to cache data stored at a second set of memory addresses in the external memory. Similarly, the third cache slice 123 is configured to cache data stored at a third set of memory addresses in the external memory, and the fourth cache slice is configured to cache data stored at a fourth set of memory addresses in the external memory. The first, second, third and fourth sets of memory addresses are all different, in that they do not share any memory addresses.

The first cache slice 121 is connected to the second cache slice 122 by a first interconnect 131. The second cache slice 122 is connected to the third cache slice 123 by a second interconnect 132. The third cache slice 123 is connected to the fourth cache slice 124 by a third interconnect 133. The fourth cache slice 124 is connected to the first cache slice 121 by a fourth interconnect 134. The interconnects are configured to carry data between the cache slices.

Each of the cache slices in the distributed cache is configured to receive a memory access request from the core to which it is connected, and/or indirectly from another core via the crossbars. For example, the first cache slice 121 can receive a memory access request from the first core 111, or from the second core 112 via the second cache slice 122 and the interconnect 131. A memory access request is issued by a core when the core requires an element of data. The memory access request specifies the memory address in the external memory at which the element of data is stored. This memory address is referred to as the target memory address. Each of the cache slices is configured to, on receiving a memory access request, identify which of the cache slices in the distributed cache 120 is configured to cache data stored at the target memory address. This cache slice is referred to as the target cache slice. Where a cache slice receives a memory access request and identifies itself as the target cache slice, the cache slice searches its cached copies of data for the cache of the data stored at the target memory address, and responsive to finding the cached copy of the data, forwards the data to the core that issued the memory access request. Where the target cache slice is not the cache slice that received the memory access request from the core, the cache slice is configured to forward the memory access request to the target cache slice via the interconnects.

Figure 2:
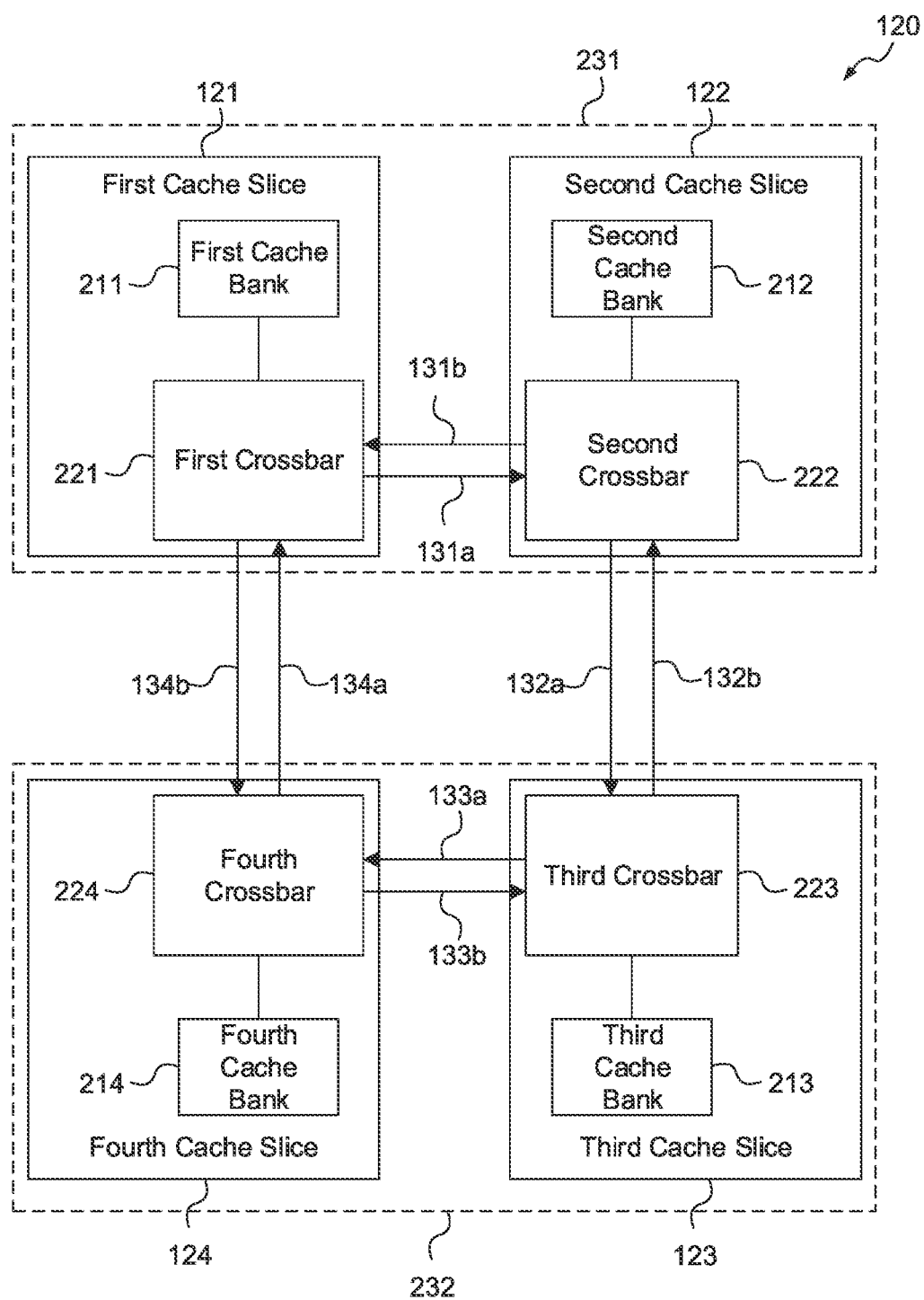
FIG. 2 is a block diagram of a distributed cache according to an example.

FIG. 2 is a block diagram of the distributed cache 120 of FIG. 1. The first cache slice 121 of the distributed cache 120 comprises a first cache bank 211 and a first crossbar 221. The second cache slice 122 comprises a second cache bank 212 and a second crossbar 222. The third cache slice 123 comprises a third cache bank 213 and a third crossbar 223. The fourth cache slice 124 comprises a fourth cache bank 214 and a fourth crossbar 224.

The cache banks 211, 212, 213, 214 cache data stored in the external memory. As explained above, each of the cache slices 121, 122, 123, 124 of the distributed cache 120 cache data stored at different memory addresses in the external memory. More specifically, the first cache bank 211 caches data stored at the first set of memory addresses in the external memory, the second cache bank 212 caches data stored at the second set of memory addresses in the external memory, the third cache bank 213 caches data stored at the third set of memory addresses in the external memory, and the fourth cache bank 214 caches data stored at the fourth set of memory addresses in the external memory. The cache banks of the distributed cache 120 are N-way associative.

The first crossbar 221 is connected to the first cache bank 211. Similarly, the second crossbar 222 is connected to the second cache bank 212, the third crossbar 223 is connected to the third cache bank 213, and the fourth crossbar 224 is connected to the fourth cache bank 214.

Each of the crossbars is configured to receive a memory access request from the core to which it is connected, and/or indirectly from another core via the crossbars. For example, the first crossbar 221 can receive a memory access request from the first core 111, or from the second core 112 via the second crossbar 222 and the interconnect 131. Each of the crossbars is configured to, on receiving a memory access request, identify which of the cache banks in the distributed cache 120 is configured to cache data stored at the target memory address. This cache bank is referred to as the target cache bank. It should be understood that the target cache bank resides in the target cache slice. The crossbars are further configured to forward the memory access request to the target cache bank. When the target cache bank resides in the same cache slice as the crossbar that receives the memory access request, this means sending the memory access request directly to the target cache bank. However, when the target cache bank does not reside in the same core as the crossbar, this means forwarding the memory access request to another cache slice in the distributed cache 120 via the interconnects. If the target cache bank contains a cached copy of the element of data, the crossbar of the cache slice comprising the target cache bank is configured to forward the element of data back to the core that issued the memory access request. The data is routed in a similar way to the memory access request—the data is either sent directly to the core, where the cache slice comprising the target cache bank is directly connected to the core, or via the interconnects to another cache slice when it is not.

The interconnects 131, 132, 133 and 134 each comprise two uni-directional interconnects. As shown in FIG. 2, the first interconnect 131 comprises interconnects 131*a* and 131*b*. Interconnect 131*a* is configured to carry data from the first crossbar 221 to the second crossbar 222, while interconnect 131*b* is configured to carry data from the second crossbar 222 to the first crossbar 221. Interconnects 132, 133, 134 similarly each comprise two uni-directional interconnects.

Each of the crossbars 221, 222, 223, 224 in the distributed cache 120 comprises a plurality of output channels. Each output channel of a crossbar is connected to either a cache bank within the same cache slice as the crossbar, or an interconnect that links the crossbar with another crossbar of the distributed cache 120. Accordingly, the first crossbar 221 comprises a first output channel connected to the first cache bank 211, a second output channel connected to interconnect 131*a* and a third output channel connected to interconnect 134*b*. The crossbars of the other cache slices are configured in a corresponding way.

The cache slices 121, 122, 123, 124 can be connected in a variety of different topologies. Two important considerations when choosing a connection topology for the distributed cache 120 are managing the amount of chip space occupied by the interconnects, and managing the degree of separation between each of the cache slices. The separation between any two slices is counted in "hops". One hop corresponds to one interconnect that must be traversed in order to move between any two cache slices. For example (still considering FIG. 2), the first cache slice 121 and the second cache slice 122 are directly connected by the interconnect 131, and are separated by one hop. The first cache slice 121 and the third cache slice 123 are separated by an intermediate cache slice (the second cache slice 122 in the clockwise direction or the fourth cache slice 124 in the anti-clockwise direction). Consequently, to move from the first cache slice 121 to the third cache slice 123 requires traversing two interconnects, meaning that the first cache slice 121 and the third cache slice 123 are separated by two hops. The smaller the hop number, the faster (all else being equal) data can be passed between the two cache slices. The delay caused by traversing interconnects is called hop latency. To reduce the performance impact of hop latency, it is desirable to reduce the maximum hop number in a distributed cache. However, reducing the number of hops separating the cache slices comes at the cost of increasing the number of interconnects between the cache slices.

Figure 3A:
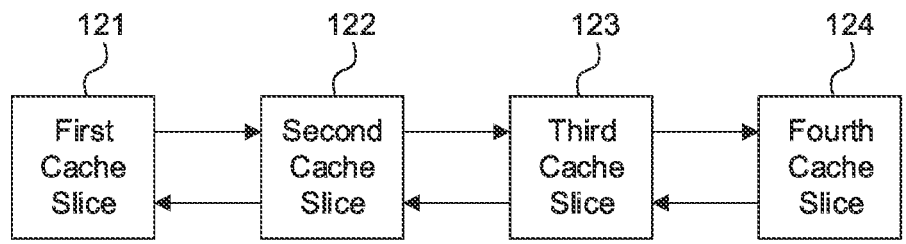
FIGS. 3A-3F are block diagrams depicting various distributed cache topologies.

FIG. 3A shows an example of a linear topology. The linear topology comprises two "end" slices (in FIG. 3*a*, the first cache slice 121 and the second cache slice 124), each directly connected to only one other cache slice. The remaining slices are "middle" slices (the second cache slice 122 and the third cache slice 123), and are each directly connected to exactly two other cache slices. The linear topology minimises the number of interconnects in the distributed cache, however, for a distributed cache comprising n slices, it also has a maximum hop number of n−1.

Figure 3B:
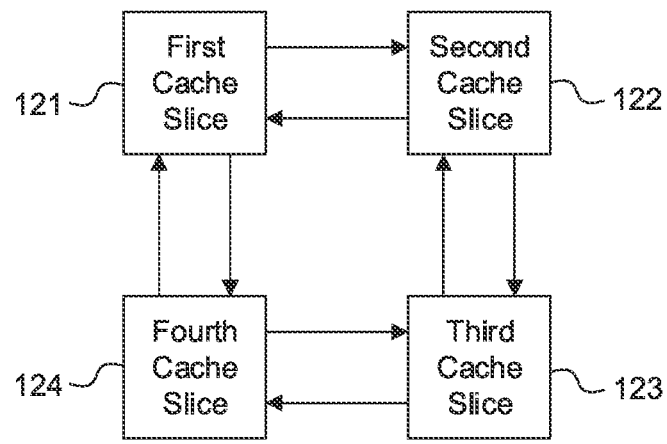

FIG. 3B shows an example of a ring topology (the topology of the distributed cache 120 of FIGS. 1 and 2). In the ring topology, each cache slice is directly connected to exactly two other cache slices. The ring topology develops the linear topology with one additional interconnect between the "end" slices. Compared to the linear topology, for a distributed cache comprising n slices, this reduces the maximum hop number to $\lfloor n/2 \rfloor$.

Figure 3C:
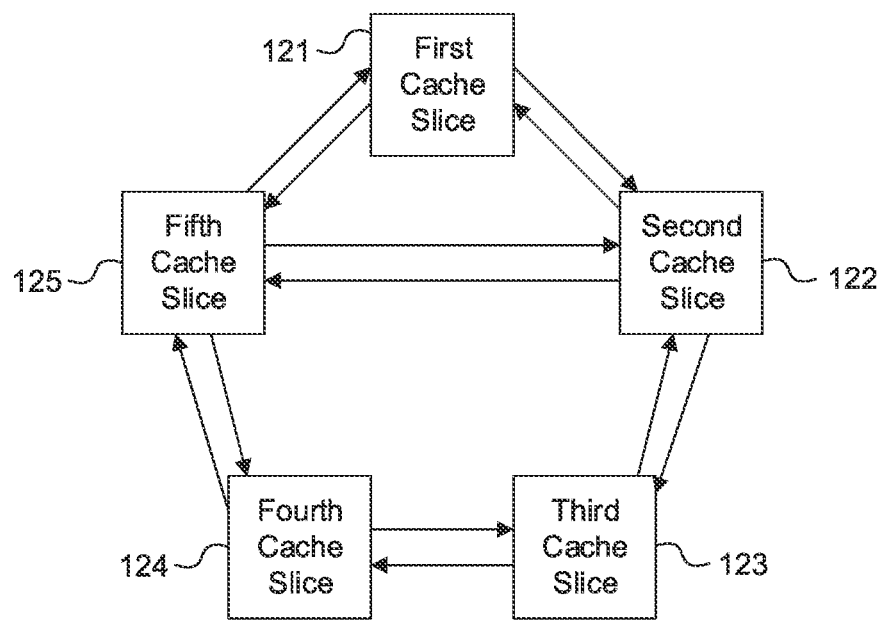
Figure 3D:
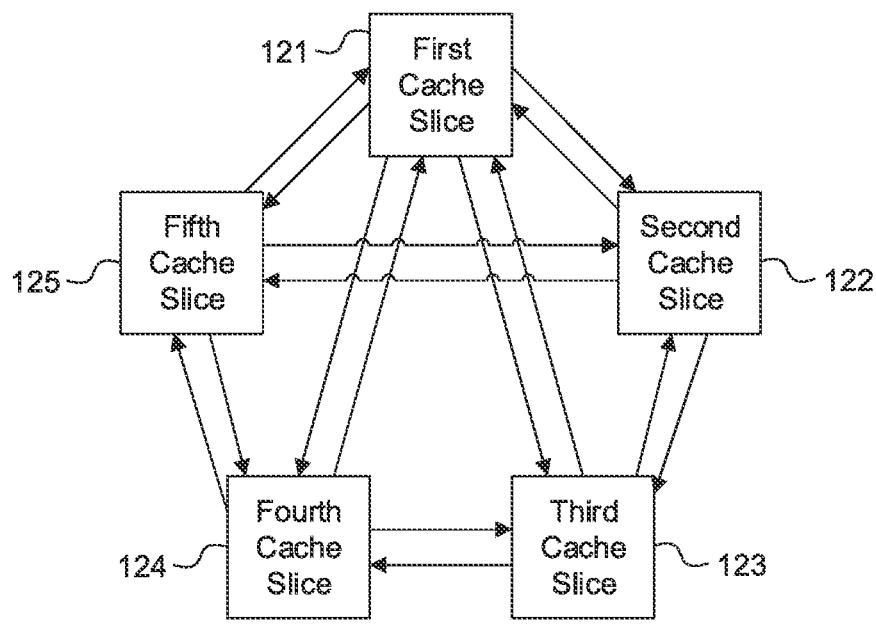
Figure 3E:
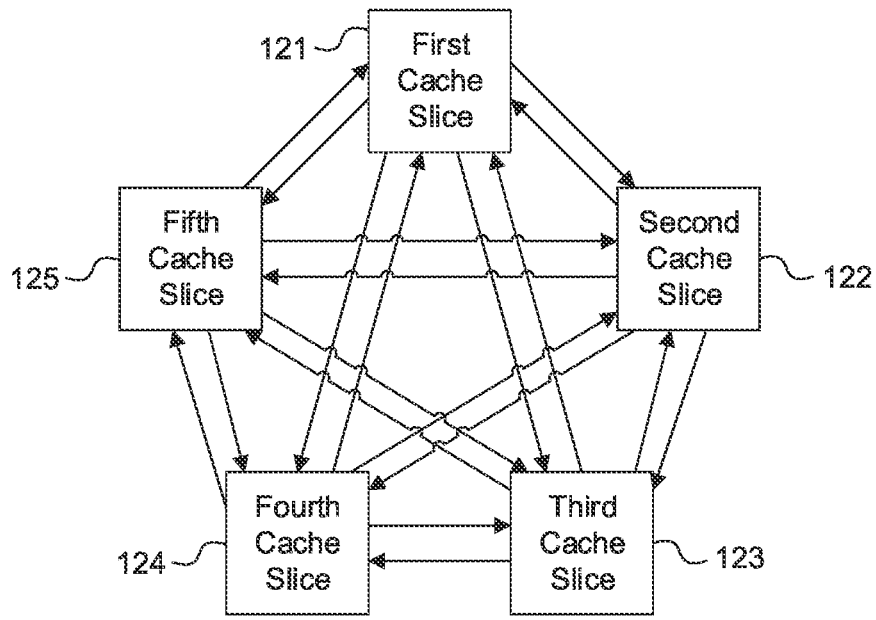

FIGS. 3C, 3D and 3E show examples of cross-linked ring topologies. Cross-linked ring topologies develop the ring topology with at least one additional interconnect that links two cache slices not already directly connected in the ring topology. This may or may not reduce the overall maximum hop number in the topology, but will reduce the hop number between at least some of the slices to the linear topology. A fifth cache slice 125 has been introduced in these figures.

FIG. 3C shows an example of a partially cross-linked ring topology. In addition to the connections found in the ring topology, the partially cross-linked ring topology comprises at least one cross-link between two of the cache slices not already directly connected. (In FIG. 3C, the cross-link connects the second cache slice 122 and the fifth cache slice 125.) This has the effect of reducing the hop number between second and fifth cache slice from 2 to 1, whilst the overall maximum hop number (e.g. between the second cache slice and the fourth cache slice) is still 2 (=$\lfloor n/2 \rfloor$). In the cross-linked topology at least two cache slices are connected to three other cache slices, and at least two cache slices are directly connected to exactly two other cache slices. This topology can only be implemented in a distributed cache comprising four or more cache slices.

FIG. 3D shows an example of a densely cross-linked topology. This topology develops on the partially cross-linked topology with additional cross-links. In the example of FIG. 3D, additional cross-links have been provided to connect the first cache slice 121 and the fourth cache slice 124, and to connect the first cache slice 121 and the third cache slice 123. In the densely cross-linked topology, each cache slice on the ring is connected to (at least) one other cache slice by a crosslink. However, not all of the cache slices are directly connected to every other cache slice. In other words, each cache slice is directly connected to at least three other cache slices, and at least two cache slices are not directly connected. As a result, whilst several pairs of cache slices are separated by a single hop, the overall maximum hop number (e.g. between the second cache slice and the fourth cache slice) is still 2 (=$\lfloor n/2 \rfloor$). This topology can only be implemented in distributed caches comprising five or more cache slices.

FIG. 3E shows an example of a fully connected topology. In this topology, each cache slice is directly connected to every other cache slice. As a result, each pair of cache slices is separated by a single hop, so the overall maximum hop number is 1. This topology has the smallest hop latency of any topology, however, it maximises the number of interconnects that are required. The ring topology and the fully connected topology are only distinguished from each other for a distributed cache comprising more than three cache slices. In other words, the two topologies are identical for a distributed cache comprising two or three cache slices.

Figure 3F:
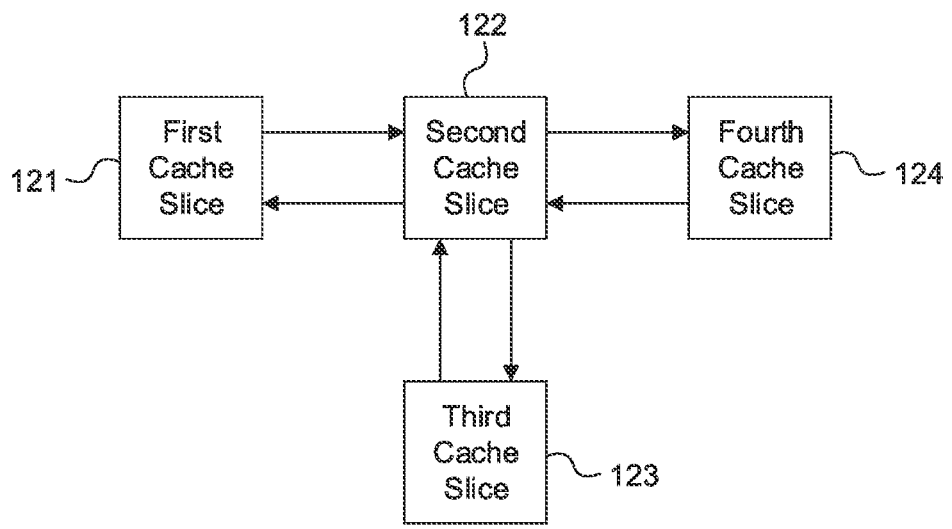

FIG. 3F depicts an example of a hybrid topology. The hybrid topology comprises at least one "end" slice, directly connected to only one other cache slice; and at least one "nexus" slice, directly connected to at least three other cache slices. As a result, whilst several pairs of cache slices are separated by a single hop, the overall maximum hop number (e.g. between the third cache slice and the fourth cache slice) is 2. The hybrid topology can only be implemented in a distributed cache comprising four or more cache slices.

The ring topologies of FIGS. 3B-3D, and the hybrid topology of FIG. 3F provide a compromise between the competing considerations of reducing hop latency and reducing the silicon area occupied by the distributed cache. These topologies may be particularly beneficial in examples comprising four or more cache slices (and a corresponding number of cores).

Returning to FIG. 1, in addition to the distributed cache 120, the processor 100 also comprises a number of other caches. The first core 111 comprises an L0 cache 141, and is connected to an L1 cache 151 and an L2 cache 161. Similarly, the second core 112 comprises an L0 cache 142, and is connected to an L1 cache 152 and an L2 cache 162. The third core 113 comprises an L0 cache 143, and is connected to an L1 cache 153 and an L2 cache 163, and the fourth core 114 comprises an L0 cache 144, and is connected to an L1 cache 154 and an L2 cache 164. The L0, L1 and L2 caches are each configured to cache data stored in the external memory. The cores are only able to access the L0, L1 and L2 caches to which they are connected. Consequently, these caches do not form a coherent view of memory between the cores.

Together with the distributed cache 120, the L0, L1 and L2 caches form a cache hierarchy. For example, considering the first core 111, the L0 cache 141 is the smallest cache and the fastest for the first core 111 to access. Following from the L0 cache 141 in the hierarchy is the L1 cache 151, then the L2 cache 161, and finally the distributed cache 120. When the first core 111 requires an element of data, the caches in the hierarchy are searched in turn (starting from the L0 cache 141) until a cached copy of the element of data is found, or until all of the caches have been searched and no cached copy of the element of data has been found, in which case the element of data is obtained from the external memory.

The L0, L1 and L2 caches are each used to store uncompressed data. In contrast to this, the distributed cache 120 and the external memory each store compressed data. In order to facilitate the transfer of compressed data from the distributed cache 120 to the L2 cache 161 (and vice versa), the L2 cache comprises a compressor 171 and a decompressor 181. The compressor 171 receives uncompressed data as an input, compresses the data, and outputs the compressed data. The decompressor 181 receives compressed data as an input, decompresses the data, and outputs the decompressed data.

It is beneficial to implement the distributed cache 120 "between" the L0-L2 caches and the external memory for a number of reasons. In some alternative cache system designs (that do not include a distributed cache 120), the L2 cache is the final cache in the hierarchy before the external memory. In these systems, the L0-L2 caches store uncompressed data while the external memory stores compressed data. By implementing the distributed cache 120 between the L2 caches and the external memory, no modification to the L0-L2 caches is required. Furthermore, by storing compressed data in the distributed cache 120, the footprint of the distributed cache 120 (in terms of silicon area) can be reduced or, conversely, its effective capacity can be increased for a given footprint. Consider an example in which the processor 100 utilises an inclusive cache design (in which the data stored in the L2 caches is duplicated in the distributed cache 120). If, in such an example, the distributed cache 120 stores uncompressed data, then the memory capacity of the distributed cache 120 would have to at least be equal to the sum of the L2 caches. However, if the distributed cache 120 stored compressed data, the memory capacity of the distributed cache 120 could be smaller by up to a factor of the compression ratio. This in turn corresponds to physically smaller memory elements. Furthermore, in order to maintain a given bit-rate of data transfer from the distributed cache 120 to the plurality of cores 110, the distributed cache 120 requires a set number of interconnects between the cache slices (due to the limited bandwidth of a single interconnect). Where the distributed cache 120 stores compressed data, the minimum number of interconnects required is again reduced proportional to the compression ratio.

Figure 4A:
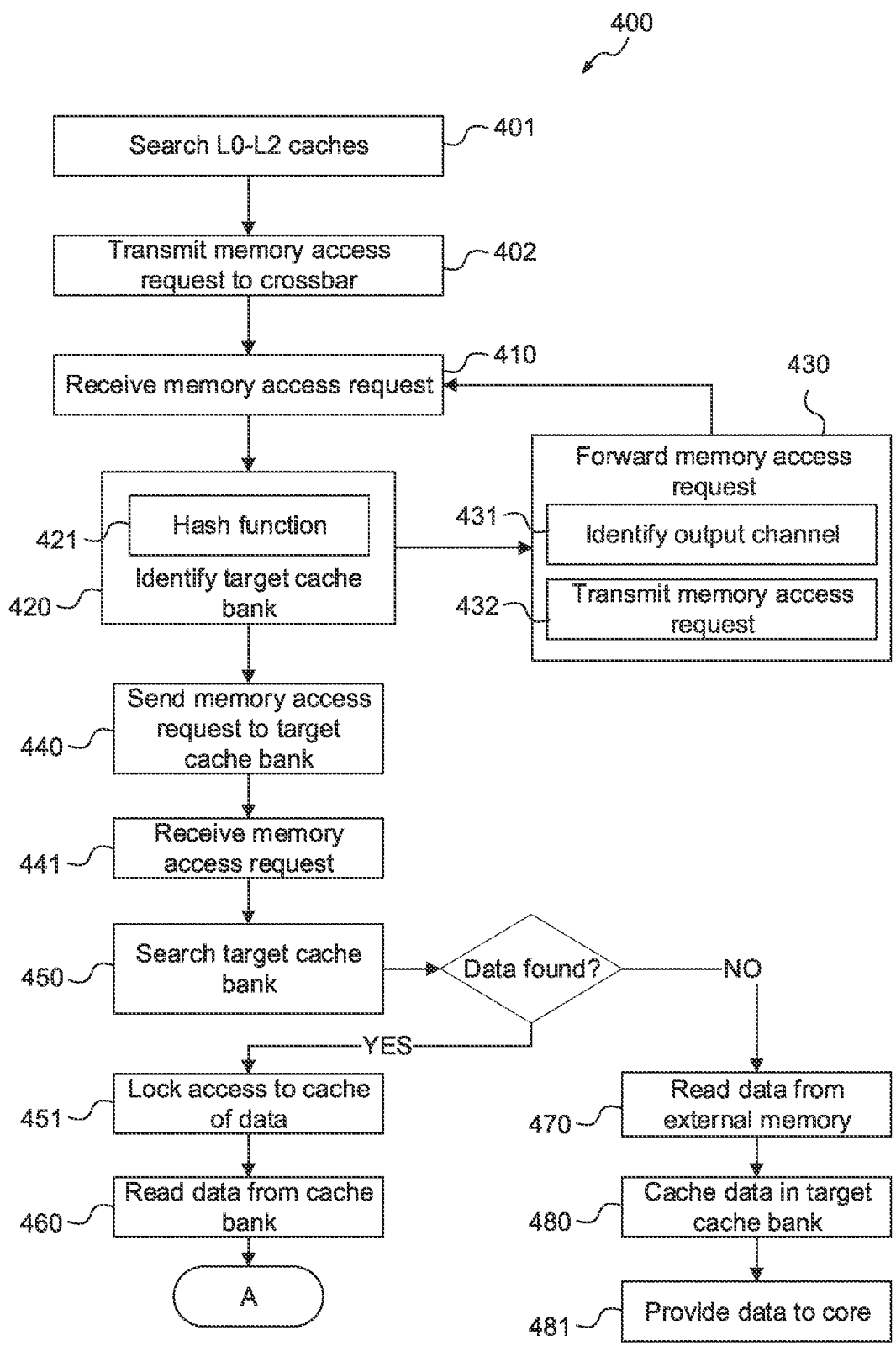
FIGS. 4A and 4B are flowcharts illustrating a method performed by the processor according to an example.

FIG. 4A is a flowchart illustrating a method 400 of obtaining data performed by the processor 100 of FIG. 1 (having the distributed cache topology of FIG. 2). In step 401 the L0-L2 caches are searched in turn for an element of data. Responsive to the element of data not being found in any of the L0-L2 caches, in step 402 the first core 111 transmits a memory access request to the first crossbar 221. The memory access request specifies the memory address in the external memory at which the element of data is stored (the target memory address). At step 410, the first crossbar 221 receives the memory access request.

In step 420, the first crossbar 221 identifies the target cache bank based on the target memory address specified by the memory access request. Each of the cache banks in the distributed cache 120 is associated with an identifier. A hash function maps each memory address in the external memory to the identifier of the cache bank configured to cache the data stored at that memory address. The first crossbar 221 uses 421 the hash function to map the target memory address to the identifier of the cache bank configured to cache data stored at the target memory address. In the present example, it will be assumed (without loss of generality) that the third cache bank 213 is the target cache bank.

At each crossbar in the distributed cache 120, the identifier of each of the cache banks is associated with an output channel of that crossbar in a routing table. The routing table is programmed to associate the identifier of a cache bank with the output channel that provides a pre-determined route to that cache bank. In the present example, the routing table is programmed to provide the most direct route from the first crossbar 221 to that cache bank.

In step 430, the first crossbar 221 forwards the memory access request to the target cache bank. The forwarding comprises identifying 431, using the routing table (and based on the identifier of the target cache bank), the output channel that provides the most direct route to the target cache bank. As was explained above, due to the topology of the present example (shown in FIG. 2), the first cache slice 121 and the third cache slice 123 are separated by two hops in both the clockwise and anti-clockwise directions. This means that the second output channel and the third output channel each provide an equally direct route to the third cache bank 213. In this example, and in these circumstances, the routing table is programmed to route the memory access request clockwise. Consequently, the first crossbar 221 identifies the second output channel. In step 432 the first crossbar 221 transmits the memory access request over interconnect 131a to the second crossbar 222.

FIG. 4A depicts a loop including steps 410, 420 and 430. This loop corresponds to the second crossbar 222 receiving the memory access request from the first crossbar 221, identifying the target cache bank using the hash function and forwarding the memory access request to the third crossbar 223, as was described above for the first crossbar 221. The loop partially repeats again as the third crossbar 223 receives the memory access request and identifies the third cache bank as the target cache bank.

In step 440, the third crossbar 223 sends the memory access request to the third cache bank 213, and in step 441 the third cache bank receives the memory access request. In step 450 the third cache bank 213 is searched for the data stored at the target memory address.

If the third cache bank 213 does not contain a cached copy of the data, then it reads 470 the data from the external memory. In step 480 the third cache bank 213 caches a copy of the data. In step 481, the third cache bank 213 provides the data to the first core 111.

Figure 4B:
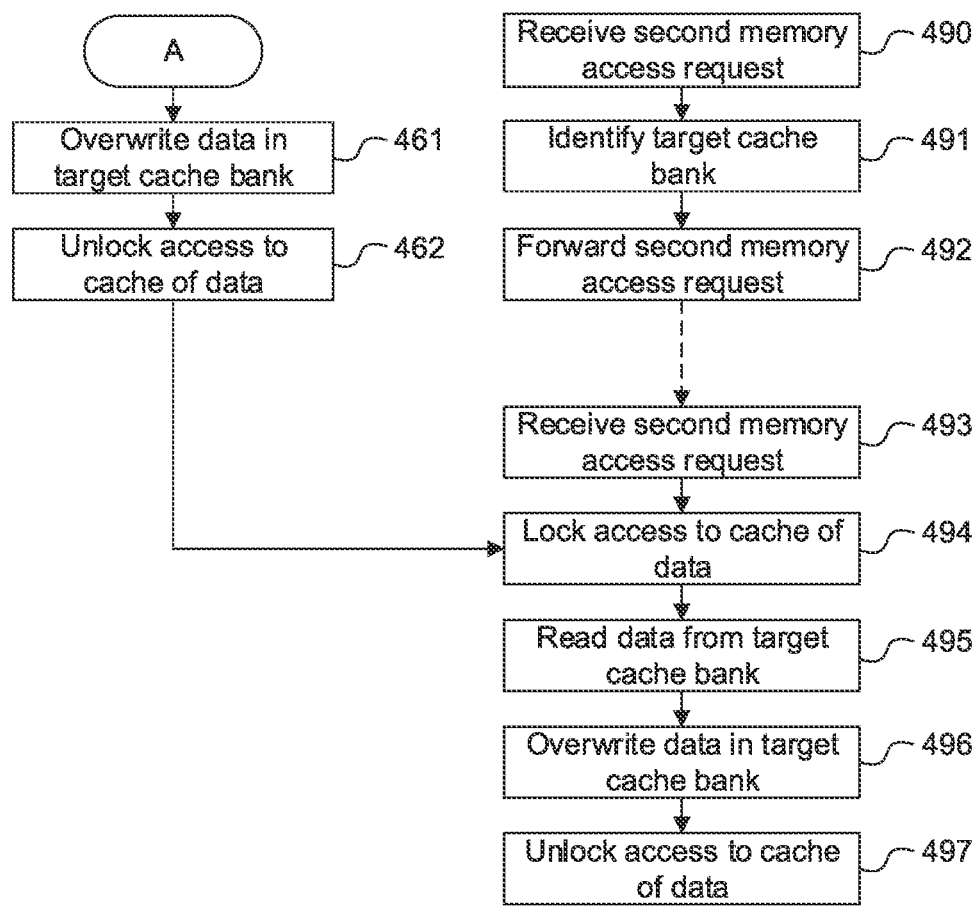

However, if the search 450 finds the data in the third cache bank 213, access to the cached copy of the data is locked 451 for all other cores. The first core 111 then reads 460 the data from the target cache bank. Turning to FIG. 4B, after reading and processing the data, the first core 111 overwrites 461 the cached copy of the data in the third cache bank 213. Access to the cached copy of the (overwritten) data is then unlocked 462.

By allowing memory access requests from any core of the plurality of cores 110 to be forwarded to any cache slice in the distributed cache 120, and because data from each external memory address can only be cached in one of the cache banks of the distributed cache 120 (and only one instance of the data is cached), each of the cores maintains a coherent view of the memory at the level of the distributed cache 120. By configuring the processor 100 to perform atomic operations in the distributed cache 120, there is no longer a risk of the cores simultaneously performing atomic operations on different cached copies of the same element of data.

More generally, the coherent view of data provided by the distributed cache 120 improves the bandwidth efficiency of the processor 100 by reducing the number of times the plurality of cores 110 need to access the external memory. For example, where the first core 111 requires an element of data that is not currently cached, that data can be obtained and cached in the distributed cache 120. The next time any of the cores—for example, the second core 112—requires that same element of data, it can obtain the data from the distributed cache 120, even though the cached copy of the element of data is not cached in the second cache slice 122. The distributed cache 120 removes the need for the second core 112 to independently access the external memory to obtain the element of data already cached for the first core 111, reducing wasted bandwidth and the time spent accessing the external memory.

In some circumstances, a core may attempt to perform an atomic operation on the cached copy of an element of data in the distributed cache 120 while another core is already processing that data in an atomic operation. For example, the second core 112 may transmit to the second cache slice 122 a second memory access request specifying the same target memory address as the first memory access request discussed above. As shown in FIG. 4B, the second crossbar 222 receives 490 the second memory access request, identifies 491 the target cache bank and forwards 492 the second memory access request to the target cache bank. This is done in the same way as was described above for FIG. 4A. For brevity, the steps performed by the third crossbar 223 have been omitted from FIG. 4B, however, it should be understood that the third crossbar 223 would perform steps corresponding to those described above for FIG. 4A.

In step 493, the third cache bank 213 receives 493 the second memory access request. For brevity, the searching step 450 has been omitted from FIG. 4B, as the presence of the data in the third cache bank has already been established in this example. The second core 112 must then wait for the third cache bank 213 to unlock access to the cached copy of the data before it can proceed. Once access to the cached copy of the data has been unlocked, the second core 112 can begin its operation and the third cache bank 213 will again lock 494 access to the cached copy of the data. In step 495 the data is read from the third cache bank 213 by the second core 112. After the second core 112 has processed the data, it can overwrite 496 the cached copy of the data with the updated data. When the second core 112 has completed its atomic operation, the third cache bank 213 unlocks 497 access to the cached copy of the data. The locking and unlocking of cached copies of data can force the cores to perform atomic operations in sequence, preventing stale data from being processed.

Figure 5:
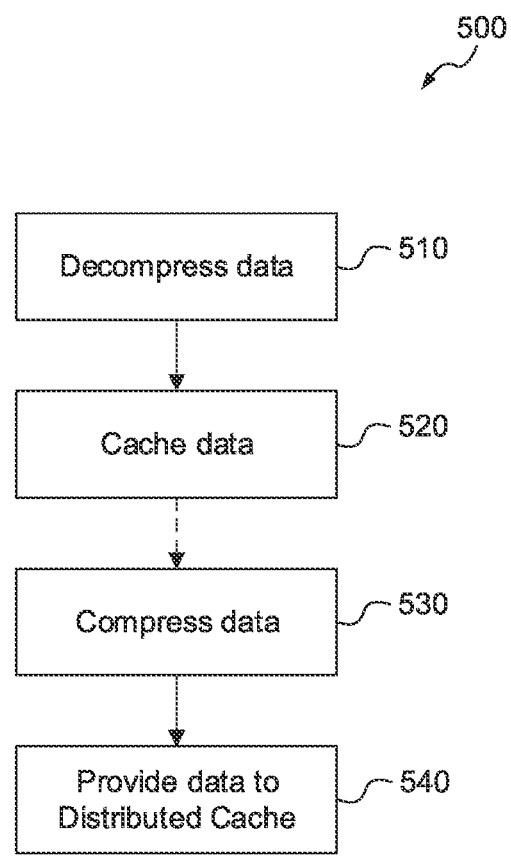
FIG. 5 is a flowchart illustrating a method performed by the processor according to an example

In order to increase the speed at which a task can be performed, a core may read an element of data from the distributed cache 120 and cache a copy of that element of data in its L2 cache. However, as was explained above, the distributed cache 120 may be used to store compressed data, while the L2 cache may be used to store uncompressed data. In order to cache data read from distributed cache 120 in the L2 cache, a core can perform the method 500 of FIG. 5. In step 510, the decompressor 181 decompresses 510 the data provided to it by the first core 111. In step 520, the decompressed data is cached in the L2 cache 161.

After the first core 111 has completed its task, it may have updated the element of data in the L2 cache 161, meaning that the cached copy of the data stored in the distributed cache 120 is now stale, and must be updated. In order to do this, the compressor 172 compresses 530 the updated element of data, and the compressed data is then provided 540 to the first cache slice 121.

While caching data in the L0-L2 caches can improve processing speed, it also has the potential to lead to fresh coherency problems. When a core updates an element of data, it can overwrite the (now stale) cached copy of that data in the distributed cache 120. However, other cores that have the stale data cached in their L0-L2 caches may be unaware of the fact that their cached copy of the data is stale. To address this, when a cached copy of an element of data in the distributed cache 120 is overwritten with updated data by a core, that core can also issue a notice to the other cores in the processor that the cached copy of the data has been overwritten. The data may be identified by its corresponding address in external memory. Any cores using a (now stale) cached copy of the data in their L0-L2 caches can then re-fetch the data from the distributed cache 120. The cores of the processor 100 may be connected to one another by a set of buses, for example in a ring topology, and the notice may be sent to the cores via the buses.

In the examples described above, each core of the plurality of cores 110 was able to access data cached in any cache bank of the distributed cache 120, providing a completely coherent view of memory. However, the processor 100 may be partitionable, such that the cores (and associated cache slices) can be split into independent domains. For example, the processor 100 may be partitioned into a first core domain comprising the first core and the second core, and a second core domain comprising the third core and the fourth core. In order for the core domains to be able to operate completely independently of one another, the distributed cache 120 must also be partitioned into corresponding first and second cache domains. Returning to FIG. 2, the first cache domain 231 comprises the first cache slice 121 and the second cache slice 122, and serves the first core domain. The second cache domain 232 comprises the third cache slice 123 and the fourth cache slice 124, and serves the second core domain. In the present example, the partitioning of the cores, and the distributed cache 120, is a logical partition implemented by means of software. The partitioning of the distributed cache 120 is implemented by configuring the crossbars in each cache domain to use a hash function that only maps to the cache banks in that same cache domain. In the previous non-partitioned example, each cache bank in the distributed cache 120 was associated with a different identifier in the hash function. Depending on the memory access request input to the hash function, the hash function could map to any of the cache banks in the distributed cache 120. However, if the processor 100 is partitioned, the crossbars of the first cache domain 231 (first crossbar 221 and the second crossbar 222) are instead configured to use a hash function that only maps to the first cache bank 211 and the second cache bank 212. As a consequence of this, memory access requests issued by the first core 111 and the second core 112 cannot be forwarded to the third cache slice 123 or the fourth cache slice 124. Similarly, the crossbars of the second cache domain 232 (the third crossbar 223 and the fourth crossbar 224) can be configured in a corresponding way. In the most extreme example, the crossbar of each cache slice can use a hash function that only maps to the cache bank(s) of that cache slice, such that each crossbar is only able to identify its own cache bank(s) as the target cache bank. In other words, the distributed cache 120 can be partitioned such that each cache slice acts as a distinct cache in its own right, only accessible by the core it is connected to. The partitioning of the distributed cache 120 may be dynamic, in that it may be implemented or altered while the processor 100 is in use. This can be achieved by reprogramming the crossbars to utilise different hash functions during operation of the distributed cache 120.

In some examples, cache banks in different cache domains may be associated with the same identifier. That is, the identifier need only be unique within each cache domain. For example, the first cache bank 211 in the first cache domain 231 and the third cache bank 213 in the second cache domain 232 may be associated with the same identifier. Similarly, the second cache bank 212 and the fourth cache bank 214 may be associated with the same identifier. This may be useful because it allows the same hash function to be used in the different cache domains.

In addition to using hash functions that only map to cache banks in given cache domains, the crossbars of the distributed cache 120 may also use routing tables configured to prevent crossbars from routing memory access requests outside their respective cache domains. In the example of FIG. 2, in which the processor 100 is partitioned into the first cache domain 231 and the second cache domain 232, the first crossbar 221 may use a routing table that does not route data over interconnect 134, and the second crossbar 222 may use a routing table that does not route data over interconnect 132. The third crossbar 223 and the fourth crossbar 224 may use similar routing tables to prevent data being routed from the second cache domain 232 to the first cache domain 231. It should be understood that, in this case, a domain can only contain cores connected to a contiguous set of cache slices.

In other words, the cache slices of a cache domain must form an unbroken chain of directly connected cache slices.

In the non-partitioned example described above, the cache banks in the distributed cache 120 cached data from different sets of memory addresses, such that data was not duplicated between cache banks. Where the processor 100 is partitioned, the crossbars of the distributed cache 120 may be configured such that no data is duplicated within a cache domain, while data may be duplicated between cache domains. However, in some cases, the domains may operate under different operating systems and/or may be used to cache data from different regions of memory. For this reason, it may not be necessary to enable data to be duplicated between cache domains.

The crossbars of the distributed cache 120 may be configurable to use various routing tables and hash functions. The ability to configure the crossbars in this way allows the processor 100 to be easily (and reversibly) partitioned without requiring modification to the physical hardware of the distributed cache 120. This configurability may be useful in cases where one or more interconnects; crossbars and/or cache banks in the distributed cache 120 are non-functional (or do not function correctly) due to damage or manufacturing errors. In the example of FIGS. 1 and 2, the routing table used by the first crossbar 221 is configured to identify the output channel that provides the most direct route to the target cache bank. If the target cache bank were the second cache bank 212, the routing table of the first crossbar 221 would identify the second output channel. However, due to manufacturing errors or in-use damage, interconnect 131a may be non-functional. In this circumstance, the first crossbar 221 can be configured to use a routing table that does not utilise interconnect 113a, and instead identifies the third output channel as providing the most direct route to the second cache bank. While this increases the number of hops separating the first cache slice 121 and the second cache slice 122, reducing processor performance, it means that all of the slices of the distributed cache 120 remain useable by all of the cores of the processor 100, preserving a coherent view of memory.

It should be understood that the scope of the present disclosure is not limited to the examples above. Many variations are possible, including but not limited to the following.

In the example of FIG. 1, the processor 100 formed a part of a graphics processing unit (GPU). However, in other examples the processor 100 may form a part of a central processing unit (CPU) or digital signal processor (DSP).

The examples described above and depicted in FIGS. 1 and 2 relate to examples in which the GPU comprises four cores and a corresponding number of cache slices. However, it should be understood that the present disclosure can be applied to a GPU (or CPU) comprising two or more cores. For example, a GPU may comprise two cores, six cores or eight cores.

In the example of FIG. 1, each core was depicted as being in direct connection with one of the cache slices of the distributed cache 120. For example, the first core 111 was depicted as being directly connected to the first cache slice 121. More specifically, each core may be connected to the crossbar of its cache slice. However, in some examples, the first core 111 may be indirectly connected to the first cache slice 121 via the L2 cache 161. For example, the first crossbar 221 may be connected to an interface within the L2 cache 161, which itself is connected to the compressor 171 and the decompressor 181 of the L2 cache 161. The remaining cores and cache slices may be configured in the same way. For example, the second core 112 may be indirectly connected to the second cache slice 122 via the L2 cache 162.

In the example of FIGS. 1 and 2, the cache slices were described as being N-way associative. However, in some examples, the cache slices may instead be fully associative or direct-mapped.

In the example of FIG. 2, each cache slice was connected to each of its neighbouring cache slices by two uni-directional interconnects, each configured to carry data in the opposite direction to the other. In some examples, each cache slice may be connected to each of its neighbouring cache slices by one or more bi-directional interconnects, able to transfer data in either direction. In some examples the cache slices may be connected to its neighbouring cache slices by more than two uni-directional interconnects.

In the example of FIGS. 1 and 2, the distributed cache 120 was used to store compressed data, while the L0-L2 caches were used to store uncompressed data. In some examples, the distributed cache 120 may also be used to store uncompressed data. In these examples, the distributed cache 120 may comprise one or more compressors and one or more decompressors. In some examples, each cache slice in the distributed cache 120 may comprise a compressor and a decompressor. The decompressor(s) may be configured to receive compressed data from the external memory, decompress the data, and provide the decompressed data to a crossbar. Where a decompressor resides in a cache slice, it may provide the crossbar of that cache slice with the decompressed data, such that the decompressed data can be cached in the distributed cache 120. Similarly, the compressor(s) may be configured to receive uncompressed data from the distributed cache 120 (and in particular, from a cache bank or from a crossbar in the distributed cache 120). The compressors may compress the data, and provide the compressed data to the external memory.

In the example of FIG. 1, the processor 100 was depicted as having a multi-level cache system comprising L0 caches, L1 caches, L2 caches and the distributed cache 120. However, in some examples, the processor 100 may be implemented without one or more of the L0-L2 caches. In some examples, the distributed cache 120 may be the only cache implemented in the processor 100.

It should be understood that the method of FIGS. 4A and 4B can be generalised to apply to any core, cache slice and cache bank of the GPU.

In some examples, a distributed cache may be connected to two or more processors, such that the two or more processors maintain a coherent view of memory using the distributed cache. In some examples, the two or more processors may comprise two CPUs, two GPUs, and/or one CPU and one GPU. In some examples, one cache slice in the distributed cache is connected to a core of the first processor, and one other cache slice in the distributed cache is connected to a core of the second processor. In some examples, at least one cache slice in the distributed cache is connected to a core of the first processor and to a core of the second processor. In some examples, each core in the two or more processors may be connected to one cache slice, and each cache slice may be connected to one core in each of the two or more processors.

In the example of FIG. 2, each cache slice was depicted as comprising one cache bank. In some examples, each cache slice may comprise multiple cache banks. Each cache bank in a cache slice may be connected to the crossbar of that slice.

In some examples, the distributed cache 120 may be physically addressed and the L0-L2 caches may be virtually addressed. In an exemplary implementation of an L0-L2 cache hierarchy, a processor may comprise a parameter management unit (PMU). The PMU may allocate portions of physical memory in the physically addressed external memory to each of the cores of the processor. The PMU may associate the portion of physical memory with a virtual address pointing to a virtual page of memory in the external memory. Each core of the processor may comprise a memory management unit (MMU), which may store mappings from virtual addresses to physical addresses. When the PMU allocates a portion of external memory to a core, the mapping between the assigned virtual address of that portion of memory and the physical address of that portion of memory may be stored in the MMU of that core.

When the L0-L2 caches of a core are searched for a copy of the data stored in that portion of the external memory, they are searched based on the virtual address provided by the PMU. If the L0-L2 caches of a core do not contain a cached copy of the data stored at that virtual address, the mapping stored in the MMU is used to convert the virtual address to a physical address. This physical address can then be used to obtain the data from the external memory. In the present exemplary implementation, the MMU is located between the L2 cache and the external memory to facilitate the acquisition of data from the external memory.

As the L0-L2 caches of a core are private (in that they cannot be accessed by other cores), and to the extent that no core needs access to memory addresses allocated to another core (which can be ensured by appropriate division of labour), there is no need for a core to be aware of the virtual addresses used by the other cores and no need for the MMU of a core to store mappings for the virtual addresses used by another core. However, in order to maintain a coherent view of memory at the level of the distributed cache 120, each core must be able to access any of the cache banks in the distributed cache 120. When a portion of external memory is allocated to a core, the cache bank in the distributed cache 120 that is configured to cache a copy of the data stored at that memory address may be in the cache slice of a different core. If the distributed cache 120 were virtually addressed, then, when the PMU allocates a portion of external memory to a core, the PMU would have to transmit the assigned virtual address and mapping for the virtual address to both the MMU of the core to which the portion of memory was assigned, and to the MMU of the core connected to the cache slice configured to cache a copy of the data stored at that memory address. The MMU of the core connected to the cache slice requires the mapping so that, if the cache slice does not contain a cached copy of the data, the virtual address can be mapped by that core to a physical address. This physical address can then be used to obtain the data from the external memory. The need to transmit virtual addresses and mappings to multiple cores increases the complexity and latency of mapping operations, reducing performance.

However, if the distributed cache 120 is physically addressed then the need to transmit the virtual address and mapping to multiple MMUs is removed. The physically addressed distributed cache 120 can be located post-MMU (that is, between the MMU of the core and the external memory). When a core searches its L0-L2 caches and the distributed cache 120 for a cached copy of an element of data, the virtual address used to search the L0-L2 caches can be mapped to a physical address by the MMU of that core, and passed to the distributed cache 120. If the distributed cache 120 does not contain a cached copy of the data, the physical address provided to the distributed cache 120 by the core can be used directly to obtain the data from the external memory. Consequently, only the core to which the portion of memory was assigned needs to store the mapping from virtual address to physical address, even where the cache slice of a different core is being searched for the data.

Additionally, using a physically addressed distributed cache 120 allows the distributed cache 120 to be implemented "on top of" the existing L0-L2 cache structure, minimising any changes to the existing virtually addressed L0-L2 cache structure that might be required.

The processor 100 may comprise a memory controller connected to the external memory. The memory controller operates using physical memory addresses. By implementing a physically addressed distributed cache 120, there is no need to map from virtual addresses to physical addresses between a cache slice of the distributed cache 120 and the memory controller. This enables the distributed cache to be located physically closer to the memory controller.

In the example of FIG. 2, each cache bank in the distributed cache 120 was associated with a unique identifier. That is, no identifier was associated with more than one cache bank in the distributed cache 120. Consequently, each crossbar in the distributed cache 120 used the same hash function to identify target cache banks. However, in some examples, the identifiers might not be unique. In an example, in the hash function of the first crossbar 221 the first cache bank 211 is associated with an identifier "1", the second cache bank 212 is associated with an identifier "2" and the third cache bank is associated with an identifier "3". However, in the hash function of the second crossbar 222 the second cache bank 212 is associated with the identifier "1", the third cache bank 213 is associated with the identifier "2" and first cache bank 211 is associated with the identifier "3". In this way, the hash functions used by the first crossbar 221 and the second crossbar 222 are different. While the identifiers are unique when considering only one of the hash functions (that is, the identifiers are unique within each hash function), the identifiers are not unique across hash functions. It should be noted that, in this example, the distributed cache 120 forms a single domain (in other words, the distributed cache 120 has not been partitioned). However, the same principle may apply within the domains of a partitioned cache. In the example described above in which the identifiers are unique, a crossbar could forward the memory access request and the unique identifier of the target cache bank to another core. The forwarding of the unique identifier meant that the crossbar receiving the memory access request did not need to perform the identification step, improving performance. However, in the present example in which each crossbar associates the same cache bank with different identifiers, each crossbar does need to identify the target cache bank.

It should be understood that method steps 401, 402, 421, 431-432, and 440-497 are optional. In some examples, some or all of these steps may be omitted.

In the example of FIG. 4A, where the clockwise and anti-clockwise routes around the distributed cache 120 to the target cache bank were equally direct, the routing table of the first crossbar 221 was programmed to route memory access requests in the clockwise direction. In some examples, in this circumstance, the routing table may instead be programmed to route memory access requests in the anti-clockwise direction. In some examples, the distributed cache 120 may be configured such that each routing table preferentially routes memory access requests clockwise (or anti-clockwise), where the clockwise and anti-clockwise routes are equally direct. In some examples, the direction may be dictated by the index of the core that issued the memory access request. For example, crossbars connected to cores with odd indices (the first core and the third core) may route memory access requests anti-clockwise where each route equally direct, while crossbars connected to even indexed cores may route memory access requests clockwise where each route is equally direct.

It should be understood that data can be returned from a cache bank to the requesting core in the same way that the memory access request was forwarded to the cache bank. The data may be passed from the cache bank to the crossbar, and forwarded from the crossbar to the requesting core. To this end, the memory access request may include an indication of the index of the requesting core, and the routing tables of the crossbars may map the indexes of the cores to output channels providing a pre-determined route to that core. Each crossbar may include an output channel though which it is connected to its core.

In the example of FIG. 4A, the third cache bank 213 was the target cache bank. However, it should be understood that any cache bank in the distributed cache 120 may be the target cache bank for a memory access request.

In the example of FIG. 4A, when the first crossbar 221 received the first memory access request, it identified the target cache bank using the hash function. Based on this, the first crossbar 221 forwarded the first memory access request to the second crossbar 222. When the second crossbar 222 received the first memory access request, it identified the target cache bank using the hash function, and forwarded the first memory access request to the third crossbar 223. In some examples, the first crossbar 221 may, when receiving the first memory access request from the first core 111, forward the identifier of the target cache bank to the second core along with the first memory access request. This removes the need for the second crossbar 222 (and any subsequent crossbars receiving the first memory access request) to identify the target cache bank, which can help to improve processing speed (particularly for topologies with large hop numbers).

FIG. 9 shows a computer system in which the (graphics) processing systems described herein may be implemented. The computer system comprises a CPU 902, a GPU 904, a memory 906 and other devices 914, such as a display 916, speakers 918 and a camera 919. A processing block 910 (corresponding to processor 100) is implemented on the GPU 904. In other examples, one or more of the depicted components may be omitted from the system, and/or the processing block 910 may be implemented on the CPU 902 or within the NNA 908. The components of the computer system can communicate with each other via a communications bus 920. A store 912 (which may correspond to the external memory) is implemented as part of the memory 906.

Figure 6:
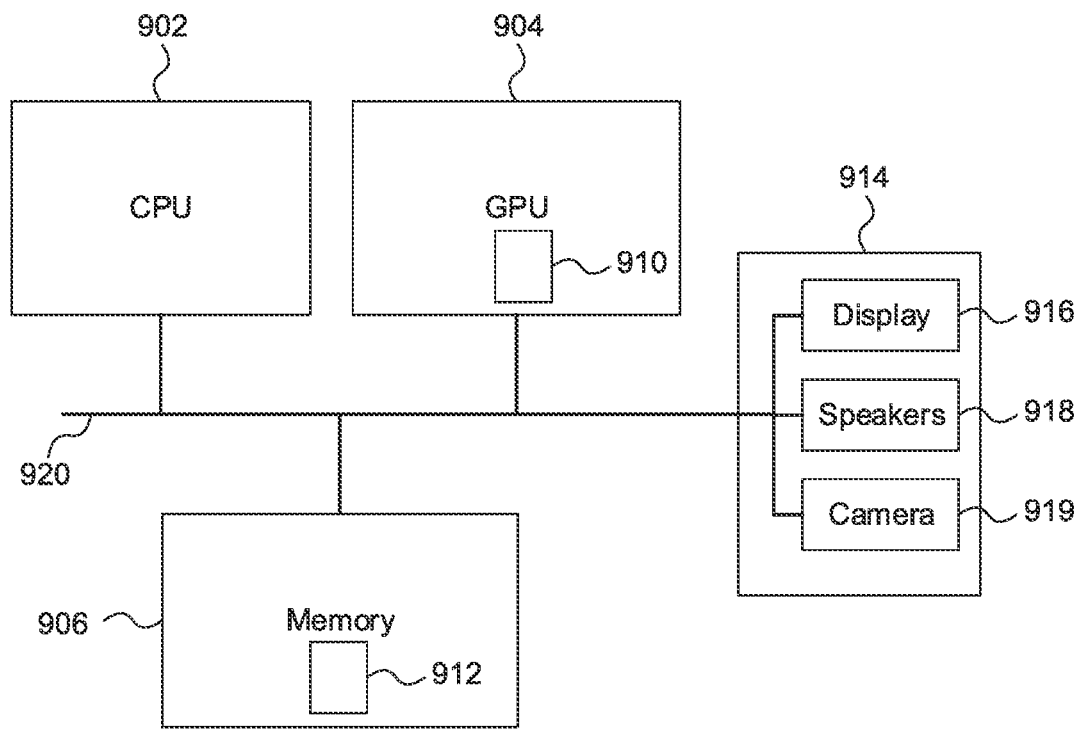
FIG. 6 shows a computer system in which a processor is implemented.

While FIG. 6 illustrates one implementation of a graphics processing system, it will be understood that a similar block diagram could be drawn for an artificial intelligence accelerator system—for example, by replacing either the CPU 902 or the GPU 904 with a Neural Network Accelerator (NNA), or by adding the NNA as an additional unit. In such cases, the processing block 910 can be implemented in the NNA.

The processor 100 of FIGS. 1-2 is shown as comprising a number of functional blocks. This is schematic only and is not intended to define a strict division between different logic elements of such entities. Each functional block may be provided in any suitable manner. It is to be understood that intermediate values described herein as being formed by a processor need not be physically generated by the processor at any point and may merely represent logical values which conveniently describe the processing performed by the processor between its input and output.

The processors described herein may be embodied in hardware on an integrated circuit. The processors described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a processor configured to perform any of the methods described herein, or to manufacture a processor comprising any apparatus described herein. An integrated circuit definition dataset may be, for example, an integrated circuit description.

Therefore, there may be provided a method of manufacturing, at an integrated circuit manufacturing system, a processor as described herein. Furthermore, there may be provided an integrated circuit definition dataset that, when processed in an integrated circuit manufacturing system, causes the method of manufacturing a processor to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processor will now be described with respect to FIG. 7.

Figure 7:
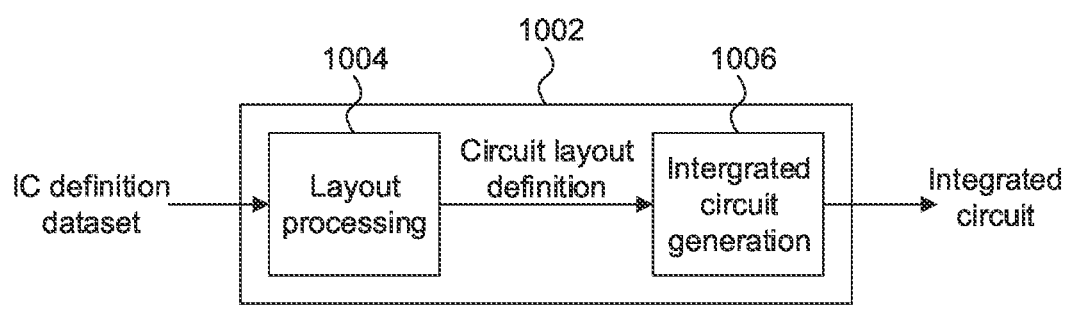
FIG. 7 shows an integrated circuit manufacturing system for generating an integrated circuit embodying a processor.

FIG. 7 shows an example of an integrated circuit (IC) manufacturing system 1002 which is configured to manufacture a processor as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a processor as described in any of the examples herein), process the IC definition dataset, and generate an IC according to the IC definition dataset (e.g. which embodies a processor as described in any of the examples herein). The processing of the IC definition dataset configures the IC manufacturing system 1002 to manufacture an integrated circuit embodying a processor as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processor without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A processor, comprising:
    a plurality of cores comprising a first core and a second core;
    a distributed cache comprising a plurality of cache slices including a first cache slice and a second cache slice; and
    a first interconnect between the first cache slice and the second cache slice;
    wherein the distributed cache is configured to cache a copy of data stored at a plurality of memory addresses of a memory;
    wherein the first cache slice is connected to the first core, and the second cache slice is connected to the second core;
    wherein the first cache slice is configured to cache a copy of data stored at a first set of memory addresses of the plurality of memory addresses;
    wherein the second cache slice is configured to cache a copy of data stored at a second, different, set of memory addresses of the plurality of memory addresses;
    wherein the first cache slice is configured to:
        receive, from the first core, a first memory access request specifying a target memory address of the memory, wherein the plurality of memory addresses includes the first target memory address,
        identify based on the target memory address a target cache slice among the first and second cache slices, wherein the target cache slice is the cache slice configured to cache a copy of the data stored at the target memory address, and
        responsive to the target cache slice being identified as the second cache slice, forward the first memory access request to the target cache slice;
    wherein the first interconnect is configured to convey the first memory access request to the second cache slice;
    wherein the first cache slice comprises a first cache bank configured to cache the copy of the data stored at the first set of memory addresses, and a first crossbar connected to the first cache bank;
    wherein the second cache slice comprises a second cache bank configured to cache the copy of the data stored at the second set of memory addresses, and a second crossbar connected to the second cache bank;
wherein the first crossbar is configured to:
receive, from the first core, the first memory access request,
identify based on the target memory address a target cache bank among the first and second cache banks, wherein the target cache bank is the cache bank configured to cache the copy of the data stored at the target memory address, and
forward the first memory access request to the target cache bank; and
wherein the first interconnect is configured to convey the first memory access request to the second crossbar when the target cache bank is identified as the second cache bank.

2. The processor of claim 1, wherein the first crossbar is configured to transmit the first memory access request to the second crossbar via the first interconnect when the target cache bank is identified as the second cache bank, and wherein the second crossbar is configured to:
receive, via the first interconnect, the first memory access request when the target cache bank is the second cache bank; and
send, to the second cache bank, the first memory access request when the target cache bank is the second cache bank.

3. The processor of claim 1, wherein the processor further comprises:
a third core;
a third cache slice; and
a second interconnect between the second cache slice and the third cache slice,
wherein the third cache slice is connected to the third core;
wherein the third cache slice comprises a third cache bank configured to cache a copy of data stored at a third set of memory addresses of the plurality of memory addresses, and a third crossbar connected to the third cache bank;
wherein the first crossbar is configured to transmit the first memory access request to the second crossbar via the first interconnect when the third cache bank is identified as the target cache bank;
wherein the second crossbar is configured to transmit the first memory access request to the third crossbar via the second interconnect when the target cache bank is identified as the third cache bank; and
wherein the third crossbar is configured to send, to the third cache bank, the first memory access request when the target cache bank is identified as the third cache bank.

4. The processor of claim 3, wherein each cache bank is associated with an identifier, wherein the first crossbar is configured to use a hash function, wherein the hash function is configured to map each memory address in the memory to the identifier of the cache bank configured to cache a copy of the data stored at that memory address, and wherein the first crossbar is configured to use the hash function to identify the target cache bank based on the target memory address.

5. The processor of claim 4, wherein the processor is partitionable to partition the cores into at least a first domain comprising the first core, the second core, the first cache slice and the second cache slice, and a second domain comprising the third core and the third cache slice, wherein the first crossbar and the second crossbar are configured to use a first hash function, and the third crossbar is configured to use a second hash function, wherein the first hash function is configured such that:
for any target memory address, the first crossbar can identify the first cache bank or the second cache bank as the target cache bank, and cannot identify the third cache bank as the target cache bank; and
for any target memory address, the second crossbar can identify the first cache bank or the second cache bank as the target cache bank, and cannot identify the third cache bank as the target cache bank;
wherein the second hash function is configured such that, for any target memory address, the third crossbar can identify the third cache bank as the target cache bank, and cannot identify the first cache bank or the second cache bank as the target cache bank.

6. The processor of claim 4, wherein the first crossbar comprises a plurality of output channels, wherein at least a first output channel is connected to the first cache bank and at least a second output channel is connected to the first interconnect, wherein the first crossbar comprises a routing table, wherein the routing table indicates, for each identifier, a predetermined output channel leading to the cache bank associated with that identifier, and wherein the first crossbar is configured to:
identify, using the routing table and based on the identifier of the target cache bank, the predetermined output channel leading to the target cache bank; and
transmit, via the predetermined output channel, the first memory access request.

7. The processor of claim 1, wherein the plurality of cache slices are connected in one of:
a linear topology, wherein at least two cache slices are each directly connected to exactly one other cache slice, and optionally wherein at least one cache slice is directly connected to exactly two other cache slices;
a ring topology, wherein each cache slice is directly connected to exactly two other cache slices to define the ring topology;
a partially cross-linked ring topology, wherein each cache slice is directly connected to at least two other cache slices to define the ring topology, wherein at least two cache slices are each directly connected to exactly two other cache slices, and wherein at least two cache slices are each directly connected to at least three other cache slices;
a densely cross-linked ring topology, wherein each cache slice is directly connected to at least three other cache slices, and wherein at least two cache slices are not directly connected to one another;
a fully connected topology, in which each cache slice is directly connected to every other cache slice; and
a hybrid topology, wherein at least one cache slice is directly connected to at least three other cache slices, and wherein at least one cache slice is directly connected to exactly one other cache slice.

8. A method of manufacturing, using an integrated circuit manufacturing system, a processor as claimed in claim 1, the method comprising inputting to an integrated circuit manufacturing system an integrated circuit definition dataset that, when processed in said integrated circuit manufacturing system, configures the integrated circuit manufacturing system to manufacture said processor.

9. A non-transitory computer readable storage medium having stored thereon an integrated circuit definition dataset that, when processed in an integrated circuit manufacturing system, configures the integrated circuit manufacturing system to manufacture a processor as claimed in claim 1.

10. A non-transitory computer readable storage medium having stored thereon a computer readable description of a processor as claimed in claim 1 that, when processed in an integrated circuit manufacturing system, causes the integrated circuit manufacturing system to manufacture an integrated circuit embodying the processor.

11. An integrated circuit manufacturing system comprising:
- a non-transitory computer readable storage medium having stored thereon a computer readable description of a processor as claimed in claim 1;
- a layout processing system configured to process the computer readable description so as to generate a circuit layout description of an integrated circuit embodying the processor; and
- an integrated circuit generation system configured to manufacture the processor according to the circuit layout description.

12. The processor of claim 1, wherein the first cache slice is directly connected to the first core and the second cache slice is directly connected to the second core.

13. A method of obtaining data for a processor, wherein the processor comprises:
- a plurality of cores comprising a first core and a second core;
- a distributed cache comprising a plurality of cache slices including a first cache slice and a second cache slice; and
- a first interconnect between the first cache slice and the second cache slice,
- wherein the distributed cache is configured to cache a copy of data stored at a plurality of memory addresses of a memory;
- wherein the first cache slice is connected to the first core, and the second cache slice is connected to the second core;
- wherein the first cache slice is configured to cache a copy of data stored at a first set of memory addresses of the plurality of memory addresses;
- wherein the second cache slice is configured to cache a copy of data stored at a second, different, set of memory addresses of the plurality of memory addresses; and
- wherein the method comprises:
  - receiving, by the first cache slice, a first memory access request specifying a target memory address of the memory, wherein the plurality of memory addresses includes the target memory address;
  - identifying, by the first cache slice, based on the target memory address, a target cache slice among the first and second cache slices, wherein the target cache slice is the cache slice configured to cache a copy of the data stored at the target memory address; and
  - responsive to the target cache slice being identified as the second cache slice, forwarding, by the first cache slice, the first memory access request to the target cache slice;
- wherein the first interconnect is configured to convey the first memory access request to the second cache slice;
- wherein the first cache slice comprises a first cache bank configured to cache the copy of the data stored at the first set of memory addresses, and a first crossbar connected to the first cache bank;
- wherein the second cache slice comprises a second cache bank configured to cache the copy of the data stored at the second set of memory addresses, and a second crossbar connected to the second cache bank; and
- wherein the method further comprises:
  - receiving, by the first crossbar, the first memory access request;
  - identifying, by the first crossbar, based on the target memory address, a target cache bank among the first and second cache banks, wherein the target cache bank is the cache bank configured to cache a copy of the data stored at the target memory address; and
  - forwarding, by the first crossbar, the first memory access request to the target cache bank;
- wherein the first interconnect is configured to convey the first memory access request to the second crossbar when the target cache bank is identified as the second cache bank.

14. The method of claim 13, wherein the forwarding comprises, when the target cache bank is identified as the second cache bank:
- identifying, by the first crossbar and using a routing table, an output channel of the first crossbar leading to the target cache bank; and
- transmitting, by the first crossbar, the memory access request to the second crossbar via the first interconnect;
- wherein the method further comprises:
  - receiving, by the second crossbar, the memory access request;
  - identifying, by the second crossbar, based on the target memory address, the target cache bank; and
  - sending, by the second crossbar, the first memory access request to the second cache bank.

15. The method of claim 13, further comprising, when the first memory access request is a read request:
- searching the target cache bank for the cached copy of the data stored at the target memory address;
- responsive to the search finding the data, reading the data stored at the target memory address from the target cache bank; and
- responsive to the search failing to find the data, reading from the memory the data from the target memory address.

16. The method of claim 13, further comprising:
- receiving, by the second crossbar, a second memory access request specifying the target memory address;
- identifying, by the second crossbar, the target cache bank; and
- forwarding, by the second crossbar, the second memory access request to the target cache bank.

17. The method of claim 13, wherein each cache bank is associated with an identifier, and wherein the identifying comprises mapping, by the first crossbar using a hash function, the target memory address to the target cache bank.

18. The method of claim 17, wherein the processor further comprises:
- a third core;
- a third cache slice; and
- a second interconnect between the second cache slice and the third cache slice,
- wherein the third cache slice is connected to the third core;
- wherein the third cache slice comprises a third cache bank configured to cache a copy of data stored at a third set of memory addresses of the plurality of memory addresses, and a third crossbar connected to the third cache bank;

wherein the method further comprises:
partitioning the processor into:
- a first domain comprising the first core, the second core, the first cache slice and the second cache slice, and
- a second domain comprising the third core and the third cache slice;

configuring the first crossbar and the second crossbar to use a first hash function; and configuring the third crossbar to use a second hash function, wherein the first hash function is configured such that:
- for any target memory address, the first crossbar can identify the first cache bank or the second cache bank as a target cache bank, and cannot identify the third cache bank as the target cache bank;
- for any target memory address, the second crossbar can identify the first cache bank or the second cache bank as the target cache bank, and cannot identify the third cache bank as the target cache bank; and wherein the second hash function is configured such that, for any target memory address, the third crossbar may identify the third cache bank as the target cache bank, and cannot identify the first cache bank or the second cache bank as the target cache bank.

19. The method of claim 13, wherein the processor further comprises:
- a third core;
- a third cache slice; and
- a second interconnect between the second cache slice and the third cache slice;

wherein the third cache slice is connected to the third core;

wherein the third cache slice comprises a third cache bank configured to cache a copy of data stored at a third set of memory addresses of the plurality of memory addresses, and a third crossbar connected to the third cache bank;

wherein the method further comprises, when the target cache bank is identified as the third cache bank:
- transmitting, by the first crossbar, the first memory access request to the second crossbar via the first interconnect;
- receiving, by the second crossbar, the first memory access request;
- transmitting, by the second crossbar, the first memory access request to the third crossbar via the second interconnect;
- receiving, by the third crossbar, the first memory access request; and
- sending, by the third crossbar, the first memory access request to the third cache bank.

20. A non-transitory computer readable storage medium having stored thereon computer readable code configured to cause the method of claim 13 to be performed when the code is run.

* * * * *